United States Patent
Yoshikawa et al.

(10) Patent No.: US 7,592,534 B2
(45) Date of Patent: Sep. 22, 2009

(54) MUSIC COMPOSITION REPRODUCTION DEVICE AND COMPOSITE DEVICE INCLUDING THE SAME

(75) Inventors: Hajime Yoshikawa, Chiba (JP); Tomohiro Hasekura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 110 days.

(21) Appl. No.: 11/578,981

(22) PCT Filed: Apr. 8, 2005

(86) PCT No.: PCT/JP2005/006956

§ 371 (c)(1),
(2), (4) Date: Feb. 21, 2007

(87) PCT Pub. No.: WO2005/104088

PCT Pub. Date: Nov. 3, 2005

(65) Prior Publication Data

US 2007/0227337 A1    Oct. 4, 2007

(30) Foreign Application Priority Data

Apr. 19, 2004  (JP) .............................. 2004-123328
Aug. 31, 2004  (JP) .............................. 2004-251624
Aug. 31, 2004  (JP) .............................. 2004-251625
Aug. 31, 2004  (JP) .............................. 2004-251634

(51) Int. Cl.
    *G10H 1/00*   (2006.01)
(52) U.S. Cl. .............................. 84/612; 84/636; 84/652; 84/668; 84/600; 700/94
(58) Field of Classification Search .......... 84/600–602, 84/612, 636, 652, 668; 700/94; 707/104.1
    See application file for complete search history.

(56) References Cited

U.S. PATENT DOCUMENTS 6,938,209 B2 *   8/2005   Ogawa et al. ................ 715/727
7,177,532 B2 *   2/2007   Roman et al. ............... 386/126

(Continued)

FOREIGN PATENT DOCUMENTS

JP    5-61463 A    3/1993

(Continued)

OTHER PUBLICATIONS

International Search Report dated Jul. 26, 2005.

(Continued)

*Primary Examiner*—David S. Warren
(74) *Attorney, Agent, or Firm*—Katten Muchin Rosenman LLP

(57) ABSTRACT

A music piece reproduction device comprises a recording section (12) for recording a plurality of music piece data each possessing a sound data file and a beat guide file containing information on the sound data file, and a control section (1) for controlling so as to connect the sound data files recorded in the recording section (12), using a predetermined method. A command comment, indicating what kind of editing is capable of being performed and at which position in the music piece, is added to the beat guide file, and the control section successively reproduces a preceding music piece and a subsequence music piece based on the command comments of these two music pieces.

26 Claims, 17 Drawing Sheets

U.S. PATENT DOCUMENTS

| | | | |
|---|---|---|---|
| 7,189,913 B2 * | 3/2007 | Moulios et al. | 84/612 |
| 7,208,672 B2 * | 4/2007 | Camiel | 84/625 |
| 7,425,674 B2 * | 9/2008 | Moulios et al. | 84/612 |
| 2002/0130898 A1 * | 9/2002 | Ogawa et al. | 345/727 |
| 2002/0134220 A1 | 9/2002 | Yamane et al. | |
| 2003/0028539 A1 | 2/2003 | Nunome et al. | |
| 2003/0065517 A1 | 4/2003 | Miyashita et al. | |
| 2003/0174127 A1 | 9/2003 | Oka et al. | |
| 2003/0205124 A1 * | 11/2003 | Foote et al. | 84/608 |
| 2004/0159221 A1 * | 8/2004 | Camiel | 84/660 |
| 2004/0254660 A1 * | 12/2004 | Seefeldt | 700/94 |
| 2005/0141885 A1 * | 6/2005 | Roman et al. | 386/125 |
| 2005/0146996 A1 * | 7/2005 | Roman | 369/30.27 |
| 2005/0235811 A1 * | 10/2005 | Dukane | 84/612 |
| 2006/0112810 A1 * | 6/2006 | Eves et al. | 84/609 |
| 2006/0212478 A1 * | 9/2006 | Plastina et al. | 707/104.1 |
| 2007/0142022 A1 * | 6/2007 | Madonna et al. | 455/352 |
| 2007/0227337 A1 * | 10/2007 | Yoshikawa et al. | 84/602 |
| 2007/0266843 A1 * | 11/2007 | Schneider | 84/612 |
| 2007/0280489 A1 * | 12/2007 | Roman et al. | 381/119 |
| 2008/0013756 A1 * | 1/2008 | Roman et al. | 381/119 |
| 2008/0097633 A1 * | 4/2008 | Jochelson et al. | 700/94 |
| 2008/0126384 A1 * | 5/2008 | Toms et al. | 707/102 |
| 2008/0140239 A1 * | 6/2008 | Rosenberg et al. | 700/94 |
| 2008/0140717 A1 * | 6/2008 | Rosenberg et al. | 707/104.1 |
| 2008/0141135 A1 * | 6/2008 | Mason et al. | 715/719 |
| 2008/0156178 A1 * | 7/2008 | Georges et al. | 84/645 |
| 2008/0236370 A1 * | 10/2008 | Sasaki et al. | 84/612 |
| 2008/0249644 A1 * | 10/2008 | Jehan | 700/94 |
| 2008/0294277 A1 * | 11/2008 | Hicken et al. | 700/94 |

FOREIGN PATENT DOCUMENTS

| | | |
|---|---|---|
| JP | 8-115084 A | 5/1996 |
| JP | 8-221062 A | 8/1996 |
| JP | 10-32774 A | 2/1998 |
| JP | 10-74071 A | 3/1998 |
| JP | 2001-109470 A | 4/2001 |
| JP | 2001-155425 A | 6/2001 |
| JP | 2002-73041 A | 3/2002 |
| JP | 2002-366561 A | 12/2002 |
| JP | 2003-15666 A | 1/2003 |
| JP | 2003-50588 A | 2/2003 |
| JP | 2003-108132 A | 4/2003 |
| WO | WO 01/16671 A1 | 3/2001 |

OTHER PUBLICATIONS

Product catalog of "Dual CDJ Player CMX-3000" Retrieved from the Internet: URL:http://www.pioneerelectronics.com/pna/v3/pg/top/product/0,,2076_310069703_289964790,00.html?compName=PNA_V3_ProductDetailComponent Product of Pioneer Corporation (JP). This document is equivalent to the pages found at URL:http://www.pioneer.co.jp/cdj/products/cmx3000.html which appeared in the present specification and is already deleted.

* cited by examiner (a)

(b)

MUSIC COMPOSITION REPRODUCTION DEVICE AND COMPOSITE DEVICE INCLUDING THE SAME

This application is a National Phase Application of International Application No. PCT/JP2005/006956, filed Apr. 8, 2005, which claims the benefit under 35 U.S.C. 119 (a-e) of Japanese Application No. 2004-123328 filed Apr. 19, 2004, Japanese Application No. 2004-251624filed Aug. 31, 2004, Japanese Application No. 2004-251625 filed Aug. 31, 2004 and Japanese Application No. 2004-251634 filed Aug. 31, 2004, which are herein incorporated by reference.

TECHNICAL FIELD

The present invention relates to a music piece reproduction device to be preferably used with a process for reproducing a plurality of music piece data in a digital format while connecting them by adjusting the reproduction speeds and beat timings thereof, and also a composite device having a plurality of modes for selective activation.

BACKGROUND ART

Music piece data in a digital format is relatively readily processed at the time of reproduction thereof such that the reproduction speed thereof is continuously changed. For such reproduction, there is available a music piece reproduction device capable of music piece reproduction while applying such a process (Twin CDJ Player CMX-3000, manufactured by Pioneer Corporation (searched as of Mar. 22, 2004), see the Internet <URL:http://www.pioneer.co.jp/cdj/products/cmx3000.html>).

According to this music piece reproduction device, in successive reproduction of two music pieces, it is possible to reproduce two music pieces while connecting them by causing the reproduction speeds thereof to coincide with each other and synchronizing the beat timings thereof.

However, in order for a conventional music piece reproduction device to reproduce two music pieces while connecting them by causing the reproduction speeds thereof to coincide with each other and synchronizing the beat timings thereof, as described above, it is initially necessary to cause the heads of the respective measures to coincide with each other and then to change the reproduction speeds thereof in order to synchronize the two music pieces.

Here, in actual play by a disc jockey (DJ), for example, two music pieces may be reproduced while being connected in the manner in which the reproduction of a certain music piece is ended at a desired point thereof and the reproduction of the following music piece begins from any desired point thereof. Further, for such reproduction, a variety of connection methods are available, including cut-in, cross-fade, long cross-fade, and so forth.

Specifically, with cut-in, while a first music piece is being reproduced (hereinafter referred to as "preceding music piece"), piece (hereinafter referred to as "subsequent music piece") is inserted with a standard sound volume. With cross-fade, while the preceding music piece is being faded out, the subsequent music piece is being faded in. With long cross-fade, a longer period of time is spent for cross-fading.

As described above, in play by a DJ, a variety of combination reproduction techniques are available beside composition and reproduction, including cut-in, cross-fade, and so forth. Specifically, with cut-in, the reproduction of the first music piece (a preceding music piece) is suddenly stopped and the reproduction of another music piece (a subsequent music piece) immediately follows, whereby the two music pieces are reproduced as if these are connected to each other in the middle thereof. With cross-fade, while the sound volume of the preceding music piece is gradually decreased, the sound volume of the subsequent music piece is gradually increased, whereby the two music pieces are gradually switched from one to the other.

The above-described reproduction while synchronizing two music pieces, however, is extremely difficult for ordinary people to achieve. That is, these combination reproduction techniques, such as composition reproduction, cut-in, cross-fade, and so forth, may not be readily enjoyed by just anyone, as these techniques require high levels of skill. Also, as these combination reproductions are originally designed to be carried out one by one by the user of the reproduction device, in order to enjoy combination and reproduction of favorite music pieces, the result of combination and reproduction conducted by the user himself/herself needs to be recorded, or the like, for example.

The present invention has been conceived in order to address the above-described problems which the conventional technique suffers, and one of the objects of the present invention is to provide a music piece reproduction device, a music piece reproduction method, a music piece reproduction program, and a storage medium storing the same, all for allowing anyone to readily reproduce music piece data like a DJ.

In order to compose and reproduce two music pieces using the above-described conventional reproduction device while causing the reproduction pitches thereof to coincide with each other and synchronizing the beat timings thereof, it is initially necessary to define the reproduction start positions of the respective music pieces at the head sounds of any measures thereof and then to change the reproduction pitches, whereby the reproduction pitches are synchronized.

Here, in recent years, as a device for use in music reproduction and TV program recording or the like, a hard disk device has been attracting increasing attention (see Japanese Patent Laid-open Publication No. 2002-94916). A hard disk device, which has characteristic features in being adapted to random access and having a large storage capacity, is capable of, for example, video data recording and reproduction of different data at the same time by making the best of the characteristic features. This remarkably enhances the degree of entertainment in viewing TV programs and music appreciation.

Meanwhile, many consumer game machines require a large capacity device, such as a hard disk or the like, as a result of increasing sophistication of game contents.

With the above as background, a composite device is developed which has a first device for reproducing music and recording TV program and a second device for realizing a function of a consumer game machine.

It is preferable for such a composite device that the hard disk can be accessed from both of the first and second devices. Further, it is preferable for a consumer game machine, or the second device, to be able to utilize the assets of game software having been accumulated from the past. In other words, the second device needs to maintain, even combined with a first device, compatibility with a home-use game device before the combination.

As described above, in order to maintain compatibility of one device and, at the same time, realize a composite device by combining the device and another device, an arrangement is desired in which a first mode in which the functions of the first device are mainly used and a second mode in which the functions of the second device are mainly used are switchable.

However, if it is further possible to import the image and/or music which is recorded using the function in the first mode into a game which is played in the second mode, development of a further variety of games can be promoted as a game using these images and music can be created.

In view of the above, another object of the present invention is to provide a composite device which can use the data which is stored in the first mode in a process to be carried out in the second mode for the purpose of development of a variety of games, for example.

DISCLOSURE OF INVENTION

A music piece reproduction device, a music piece reproduction method, a music piece reproduction program, and a storage medium storing the same according to the present invention are characterized in that, in order to reproduce, while connecting, the sound data files of the plurality of music piece data using a predetermined method while reference to a plurality of music piece data each possessing a sound data file indicative of a music piece for reproduction and a beat guide file containing information on the sound data file, a command comment which indicates what kind of editing is capable of being performed in which position in the music piece is arranged to be added to each of the beat guide files of the plurality of music piece data, and when the sound data file of a preceding music piece which is a music piece to be reproduced in a preceding order is connected to the sound data file of a subsequent music piece which is a music piece to be reproduced subsequent to the preceding music piece, the preceding and subsequent music pieces are successively reproduced depending on the command comment of the preceding music piece and the command comment of the subsequent music piece.

Further, a composite device according to the present invention comprises a first device, a second device, and a storage section having a common area which can be accessed by both of the first and second devices, and is selectively activated in either a first mode in which the second device functions as an interface of the first device or a second mode which is different from the first mode. When the composite device is activated in the first mode, data for processing is converted by the first device into data in a predetermined format, and the converted data is stored in the common area. Thereafter, the composite device is activated in the second mode instead of the first mode.

Still further, in order to address the above-described problems of the conventional art, according to the present invention, there is provided a reproduction device for combining and reproducing music pieces or videos using a plurality of music pieces or video data. The reproduction device is connected so as to be able to access a rule holding device for holding a plurality of reproduction rules concerning combination reproduction and a condition holding device for holding a presentation condition in a manner associated with each of the reproduction rules, and comprises rule selection means for selecting one of the reproduction rules which satisfy the presentation condition held in the condition holding section, and a reproduction device for carrying out combination reproduction of music pieces or videos using the plurality of music pieces or video data based on the reproduction rule selected.

BEST MODE FOR CARRYING OUT THE INVENTION

A music piece reproduction device according to the present invention can be used, for example, in successively reproducing, while connecting, a plurality of music piece data in a desired style while adjusting the reproduction speeds and beat timings thereof using a predetermined method.

In the following, with reference to the accompanying drawings, a structure and an operation of a music piece reproduction device which is one embodiment of the present invention will be described in detail.

Structure of Music Piece Reproduction Device

Structure of Main Body

Figure 1:
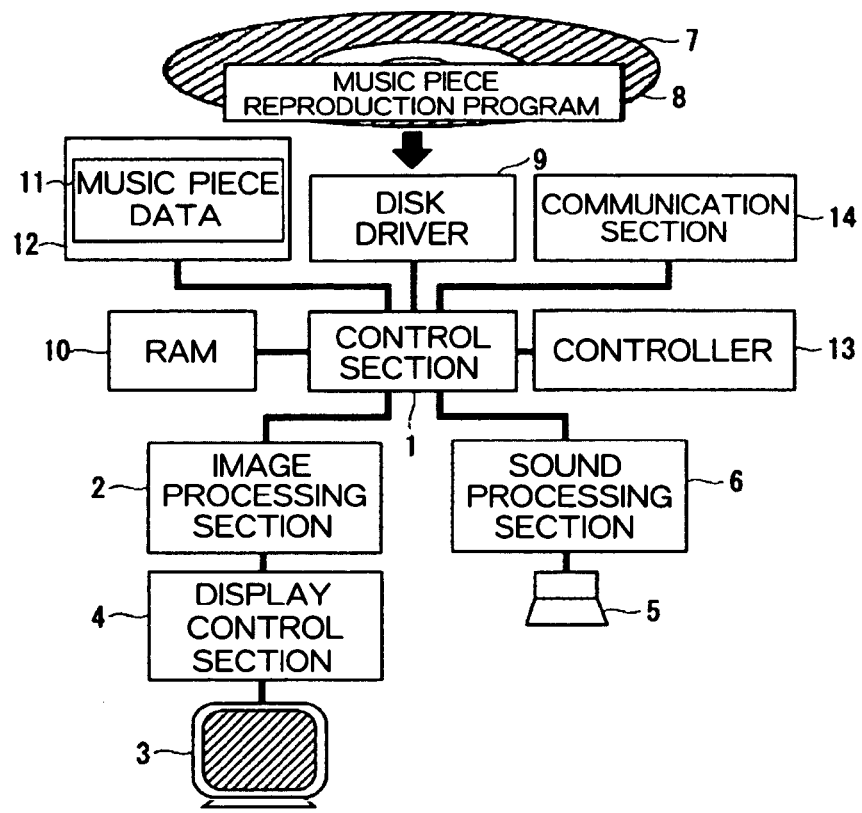
FIG. 1 is a block diagram showing an internal structure of a music piece reproduction device according to one embodiment of the present invention.

As shown in FIG. 1, a music piece reproduction device which is one embodiment of the present invention comprises a control section 1 for controlling signal processing and an internal structural element according to a variety of computer programs, an image processing section 2 for carrying out a rendering process according to an instruction sent from the control section 1 to thereby produce various image data relevant to a music piece reproduction process, a display control section 4 for controlling so as to display the image data produced by the image processing section 2 in a display 3, and a sound processing section 6 for carrying out a sound process according to an instruction sent from the control section 1 and then outputting a sound via a speaker 5.

The music piece reproduction device further comprises a disk driver 9 for reading various computer programs, such as a music piece reproduction program 8, and process data both recorded in an optical disc 7, such as a DVD-ROM, CD-ROM, or the like, for realizing a music piece reproduction process to be described later, a RAM (Random Access Memory) 10 for realizing a buffer function for temporarily storing the various computer programs and process data read from the optical disc 7 and also a working area function for the control section 1, a ROM (Read Only Memory) 12 for storing various computer programs, digital data 11 of a music piece (hereinafter referred to as "music piece data"), or the like, and process data, a controller 13 for being operated by a user when inputting various instructions relevant to the music piece reproduction process, and a communication section 14 for carrying out an information communication process utilizing an electrical communication line, such as the Internet, LAN (Local Area Network), or the like.

It should be noted that, although the music piece reproduction program 8 is recorded in the optical disc 7 in this embodiment, the music piece reproduction program 8 may alternatively be stored in the ROM 12 as a result of execution of a process such as installation, downloading using a communication section 14, or the like. Still alternatively, the music piece reproduction program 8 may be stored in a storage medium, such as a flexible disk, or the like, other than the optical disc 7. In this case, a reading device in conformity with the format of the storage medium which uses the disk driver 9 is employed.

Further, although the music piece data 11 is recorded in the ROM 12 in this embodiment, the music piece data 11 may alternatively be introduced into the device using other methods, such as by reading from the optical disc 7 or downloading using the communication section 14.

Structure of Music Piece Reproduction Program

Figure 2:
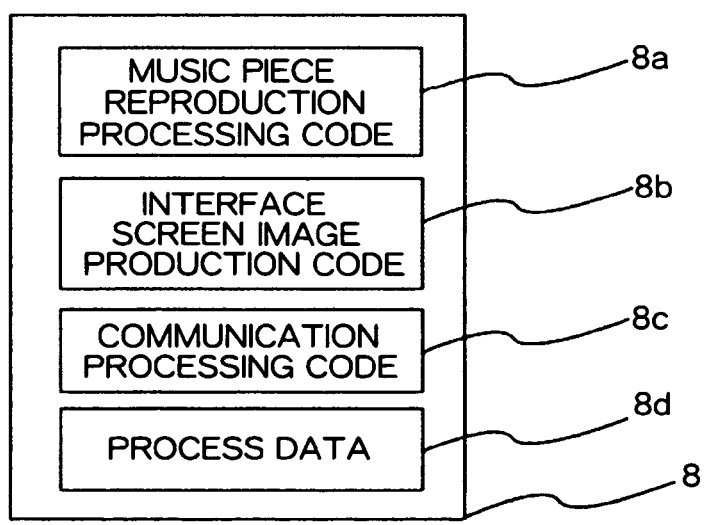
FIG. 2 is a block diagram showing a structure of the music piece reproduction program according to one embodiment of the present invention.

The music piece reproduction program 8 is formed using a computer program code for causing the control section 1 to carry out a music piece reproduction process to be described later. As shown in FIG. 2, this music piece reproduction program 8 comprises a music piece reproduction processing code 8a for controlling the sound processing section 6 to carry out a music piece reproduction process, an interface screen image production code 8b for controlling the image processing section 2 to produce various image data relevant to the music piece reproduction process, a communication processing code 8c for controlling the communication section 14 to carry out a communication process with respect to an outside using an electrical communication line, and various process data 8d for use in the music piece reproduction process.

Structure of Music Piece Data

Figure 3:
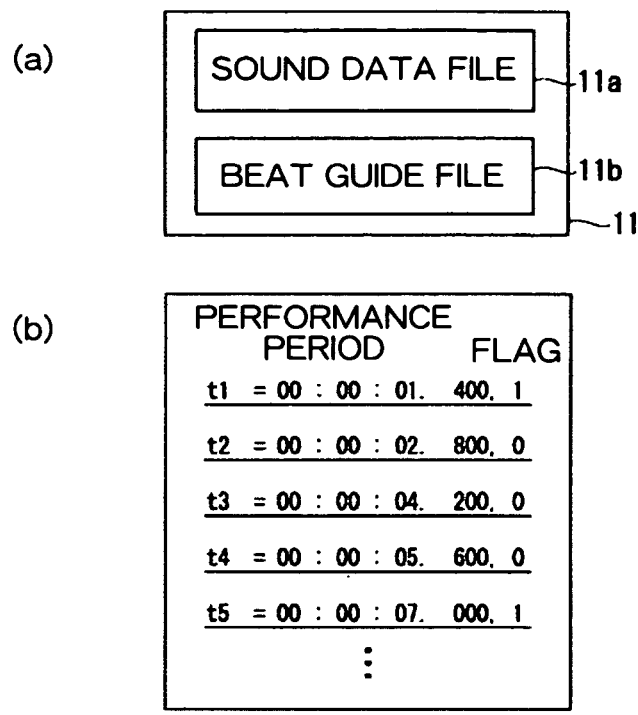
FIG. 3(a) is a block diagram showing a structure of music piece data according to one embodiment of the present invention.
FIG. 3(b) is a diagram showing one example of a beat guide file.

As shown in FIG. 3(a), the music piece data 11 contains, for every music piece, a sound data file 11a and a beat guide file 11b, both being associated with each other.

Figure 4:
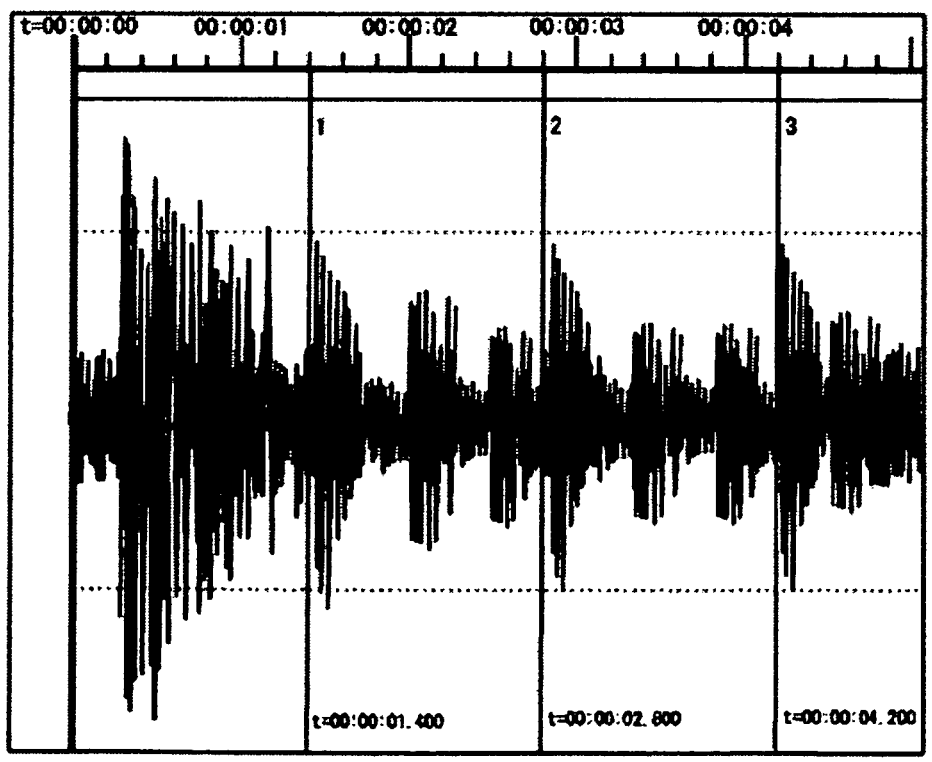
FIG. 4 is a diagram explaining one example of the content of the sound data shown in FIG. 3(a)

The sound data file 11a is formed comprising PCM (Pulse Code Modulation) sound source data, and, when processed by the sound processing section 6a, results in producing a sound having a waveform signal as shown as an example in FIG. 4.

The beat guide file 11b contains information which describes a beat timing, a reproduction speed indicative of a speed at which to reproduce, the head position of each measure, and so forth. As for the respective beat timing positions t1 through t5A, a beat timing is expressed in the form of a reproduction period of time elapsed after the head position of each sound data file, as shown in FIG. 3(b). The head position of each measure is indicated by a flag attached to each beat. Specifically, in the example shown in FIG. 3(b), "0" or "1" attached to the end of each performance period of time corresponds to the flag.

It should be noted that although the beat guide file 11b is generally contained in the data 11, this is not a limited example. That is, the beat guide file 11b can alternatively be obtained, for example, by analyzing the music piece data in the server device or the like and receiving, via a communication line, the beat guide file which is obtained as a result of the analysis. The timing at which to produce a beat guide file is not particularly limited, and the guide file can be produced at a desired timing. For example, the beat guide file can be downloaded in response to the user's request, or may be produced with respect to a music piece for which the user wishes to produce a beat guide file and transmitted.

Although it is determined in this embodiment that the reproduction speed is calculated based on the information on a beat timing which is contained in the beat guide file 11b, the reproduction speed may alternatively be calculated in advance and held as a numeric value in the beat guide file, for example.

It should be noted that the above-described reproduction speed is a standard reproduction speed as an initial value, and is a specific fixed value.

Meanwhile, in the music piece connection and reproduction process to be described later, the value of at least one of the reproduction speeds of the preceding and subsequent music pieces is changed depending on the difference between the reproduction speeds of the preceding and subsequent music pieces, so that the music pieces can be successively reproduced.

In this embodiment, the beat guide file 11b can additionally possess a comment. That is, if desired the user can add a comment to the beat guide file 11b. Among the comments, the following are comments referred to as command comments, which suggest the content of editing relating to a music piece and assist the music piece reproduction process in this embodiment. The command comments are used as reservation terms of the comments. In detail, eight kinds of command comments are available as the command comments in this embodiment, including HEAD, LONG HEAD, TAIL, LONG TAIL, CUTIN, SABI, BREAK, and DUB. The meanings of these command comments will be described later in a description on the music piece reproduction process which is carried out using these comment commands.

Structure of Controller

Figure 5:
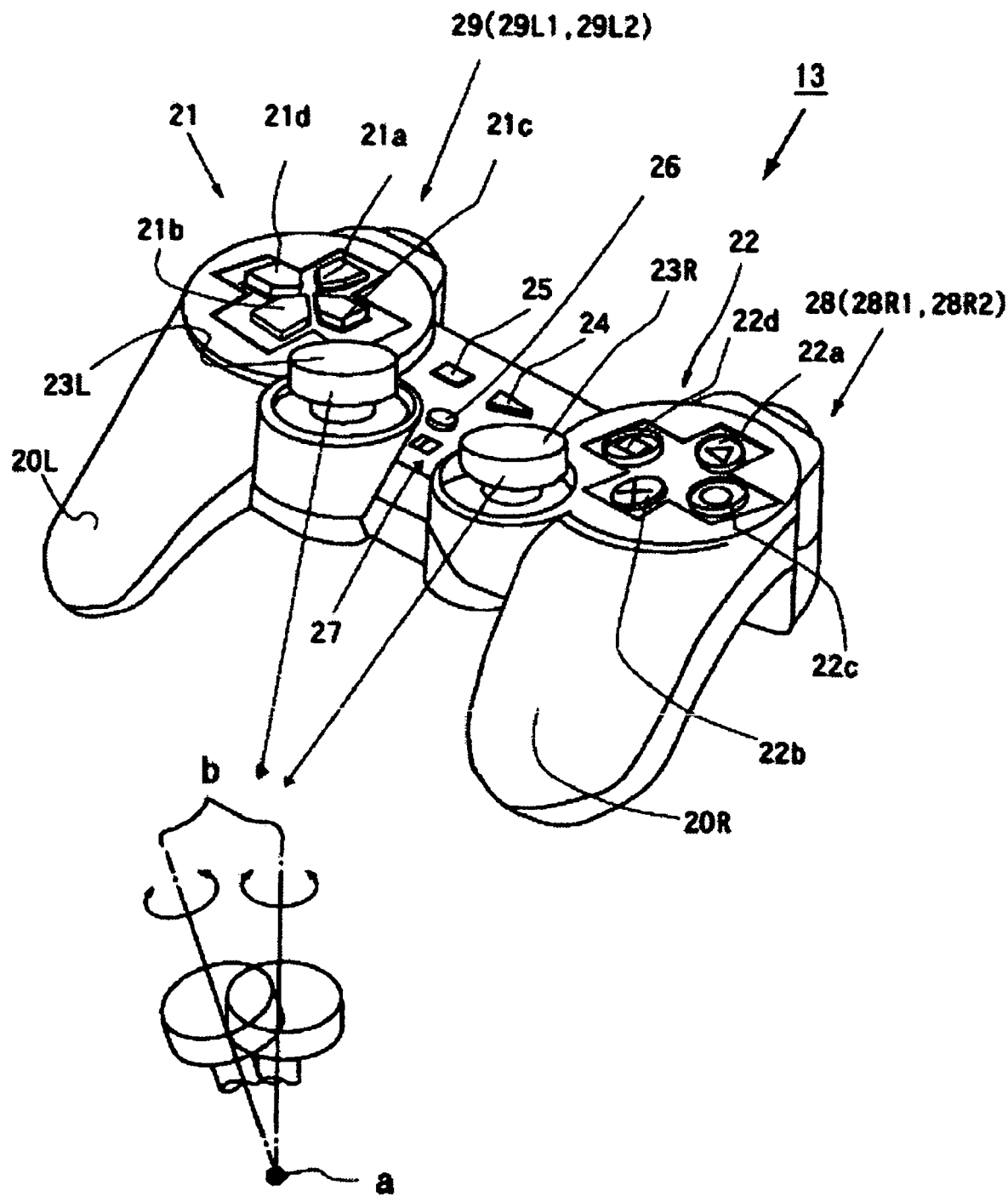
FIG. 5 is a schematic diagram showing a structure of the controller shown in FIG. 1.

As shown in FIG. 5, the controller 13 is constructed capable of being held by a user with their right and left hands while grasping the grip sections 20R, 20L, respectively. On the controller 13, at positions capable of being operated by the user with their thumbs, for example, while grasping the grip sections 20R, 20L with their right and left hands, respectively, first and second operation sections 21, 22 and analogue operation sections 23R, 23L are provided.

In the first operation section 21, an upper direction instruction key 21a, a lower direction instruction key 21b, a right direction instruction key 21c, and a left direction instruction key 21d are provided. While using these instruction keys 21a, 21b, 21c, and 21d, the user can specify an operation object.

In the second operation section 22, a triangle button 22a having a triangular imprint formed thereon, an X button 22b having an X-shaped imprint formed thereon, an O button 22c having an O-shaped imprint formed thereon, and a rectangle button 22d having a rectangular imprint formed thereon are provided. These buttons 22a, 22b, 22c, and 22d are assigned with respective operation contents according to an operation object specified by the direction keys 21a, 21b, 21c, and 21d. The user can carry out an operation relative to the operation object specified using the instruction keys 21a, 21b, 21c, and 21d, by selecting and pressing an appropriate button 22a, 22b, 22c, or 22d.

The analogue operation sections 23R, 23L are adapted to an operation by being tilted with the point a serving as a fulcrum. The analogue operation sections 23R, 23L are also adapted to rotation in the tilted posture around the rotational axis b which is defined as passing through the point a. During an operation in a non-tilting position, these operation sections 23R, 23L are held in a standing position, as shown in FIG. 5, and maintained in the untitled position (a reference position).

When these operation sections 23R, 23L are subjected to a tilting operation by being pressed, coordinate values (x, y) on the x-y coordinate which are defined according to the amount and direction of the tilt relative to the reference position are determined and output as an operation output to the control section 1.

Also, the controller 13 additionally comprises a start button 24 for instructing the center device 1 to execute a music piece reproduction program, a selection button 25 for switching monitor modes, and a mode selection switch 26 for selecting either an analogue or digital mode.

When an analogue mode is selected by the mode selection switch 26, the light emission diode (LED) 27 is controlled so as to emit light, and the analogue operation sections 23R, 23L are put in an operating state. Meanwhile, when the digital mode is selected, the light emission diode 27 is controlled so as to turn off the light, and the analogue operation sections 23R, 23L are put in a non-operating state.

Further, a right button 28 and a left button 29 are respectively provided on this controller 13, at positions capable of being operated by the user with their index fingers (or middle fingers), for example, while grasping the grip sections 20R, 20L with their right and left hands. The respective buttons 28, 29 have first and second right buttons 28R1, 28R2, and first and second left buttons 29L1, 29L2, which are arranged side by side in the width direction of the controller 13, for operating a cross-fader (=mixer) object to be displayed in the display 3 when the music piece reproduction process is carried out.

As described above, the music piece reproduction device which is one embodiment of the present invention is constructed such that the control section 1 carries out a music piece reproduction process in conformity with the user's operation input from the controller 13 with respect to the music piece data 11 designated by the user according to the music piece reproduction program 8.

In the following, the music piece reproduction process will be described in detail with reference to FIG. 6 through FIG. 8.

Music Piece Reproduction Process

Displaying Process of Interface Screen Image

When the user inserts an optical disc 7 on which the music piece reproduction program 8 is recorded into the disk driver 9, the control section 1 controls the disk driver 9 so as to read the music piece reproduction program 8 from the optical disc 7 to the RAM 10. When the user thereafter presses the start button 24 of the controller 13 to thereby instruct execution of the music piece reproduction program 8, the control section 1 controls the image processing section 2 according to the interface screen image production code 8b so as to display the interface screen image shown in FIG. 6 in the display 3.

When the interface screen image is displayed in the display 3, the user can execute the music piece selection process and parameter change process described below by operating the controller 13 while referring to the information shown in the interface screen, to thereby carry out an operation to reproduce the desired music piece data 11. Also, as required, the control section 1 controls the communication section 14 according to the communication processing code 8c so as to exchange data with the outside via an electrical communication line.

The interface screen image in this embodiment is prepared so that the user can concurrently reproduce two music piece data 11. Specifically, as shown in FIG. 6, the interface screen image includes music piece selection windows 42a, 42b and the turntable objects 43a, 43b. In the music piece selection windows 42, 42b, the names of the reproducible music pieces and the cursors 41a, 41b each for indicating the currently selected music piece data 11 for reproduction are respectively shown. The respective turntable objects 43a, 43b have record objects 50a, 50b (see FIG. 7) each indicating the selected music piece data 11.

Figure 6:
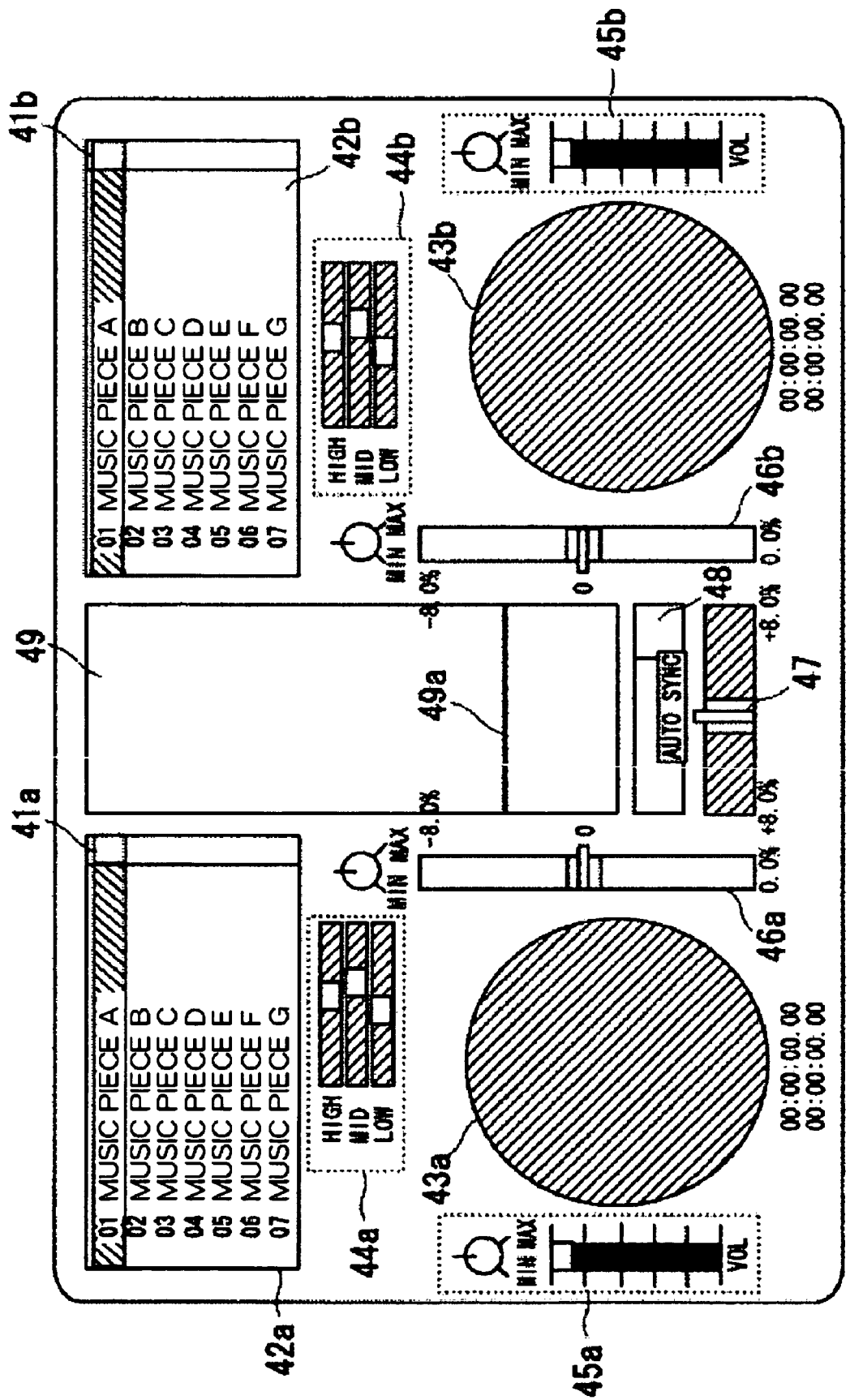
FIG. 6 is a schematic diagram showing a structure of an interface screen according to one embodiment of the present invention.

In addition, the interface screen image shown in FIG. 6 has main structural elements including equalizer objects 44a, 44b for adjusting the frequency of the selected music piece data 11, sound volume adjustment objects 45a, 45b for adjusting the reproduced sound volume of the selected music piece data 11, speed adjustment objects (speed sliders) 46a, 46b for adjusting the reproduction speeds of the music piece data 11, a cross fader object 47 for adjusting the mixing ratio of the two music piece data 11, a synchronizing operation object 48 for adjusting the beat timings of the two music piece data 11, a reproduction line 49a for indicating a reproduction position of the music piece data 11, and a beat guide window 49 for indicating the beat progress of the respective music piece data 11.

It should be noted that, although it is arranged in this embodiment such that the file names of the music piece data 11 stored in advance in the ROM 12 are shown as the names of the reproducible music pieces in the music piece selection windows 42a, 42b, the file names of the music piece data 11 which are stored in any places other than the ROM 12 may be displayed according to the user's designation which is made by the user by operating the controller 13 to designate a place to be referred to for the file names of the music piece data 11.

In this embodiment, once the names of the reproducible music pieces are displayed in the music piece selection windows 42*a*, 42*b*, the control section 11 compares the beat guide files 11*b* of the music piece data 11 of, for example, three or more music pieces with one another, produces a play list in which the names of the music piece data 11 having relatively close reproduction speeds are listed close to one another, and displays the produced play list in the respective music piece selection windows 42*a*, 42*b*. In the above, genre information, for example, may additionally be referred to as an object for comparison.

Specifically, the control section 11 randomly selects a music piece to be listed at the top of the play list, and checks the reproduction speed of the selected music piece (a preceding piece speed). It should be noted that for a music piece having a reproduction speed that varies in the middle, for example, a reproduction speed may be calculated at any representative position such as at the head portion thereof.

Thereafter, the control section 11 randomly selects a candidate for a music piece to be next included in the play list, and calculates the reproduction speed of that music piece (a subsequent piece speed). When the difference between the preceding and subsequent piece speeds is larger than a predetermined value, the process to randomly select a candidate for a music piece to be next included in the play list is repeated.

On the other hand, when the difference between the preceding and subsequent piece speeds is smaller than a predetermined value, that music piece candidate is added to the play list. Thereafter, while using the reproduction speed of the added music piece as a preceding piece speed, the process to randomly select a candidate for a music piece to be next included in the play list is repeated.

In the case where genre information is also considered, whether or not the genres of the preceding and subsequent music pieces satisfy a predetermined genre condition is determined, and when they do, the candidate for the subsequent music piece is determined as a subsequent music piece.

"Genre condition" as referred to here is information describing, for every combination of the genres of the preceding and subsequent music pieces, whether or not successive reproduction of the preceding and subsequent music pieces is permitted.

Once the play list is displayed in the music piece selection windows 42*a*, 42*b* as described above, the user can change the content of the play list. Specifically, the user can reorder the music pieces to be reproduced by moving the cursors 41*a*, 41*b* by operating the controller 13.

Command Comment Addition Process

Once the order in which to reproduce the music pieces is determined, a process to add a command comment for appropriately connecting the music pieces for reproduction in the determined order can be carried out.

Figure 7:
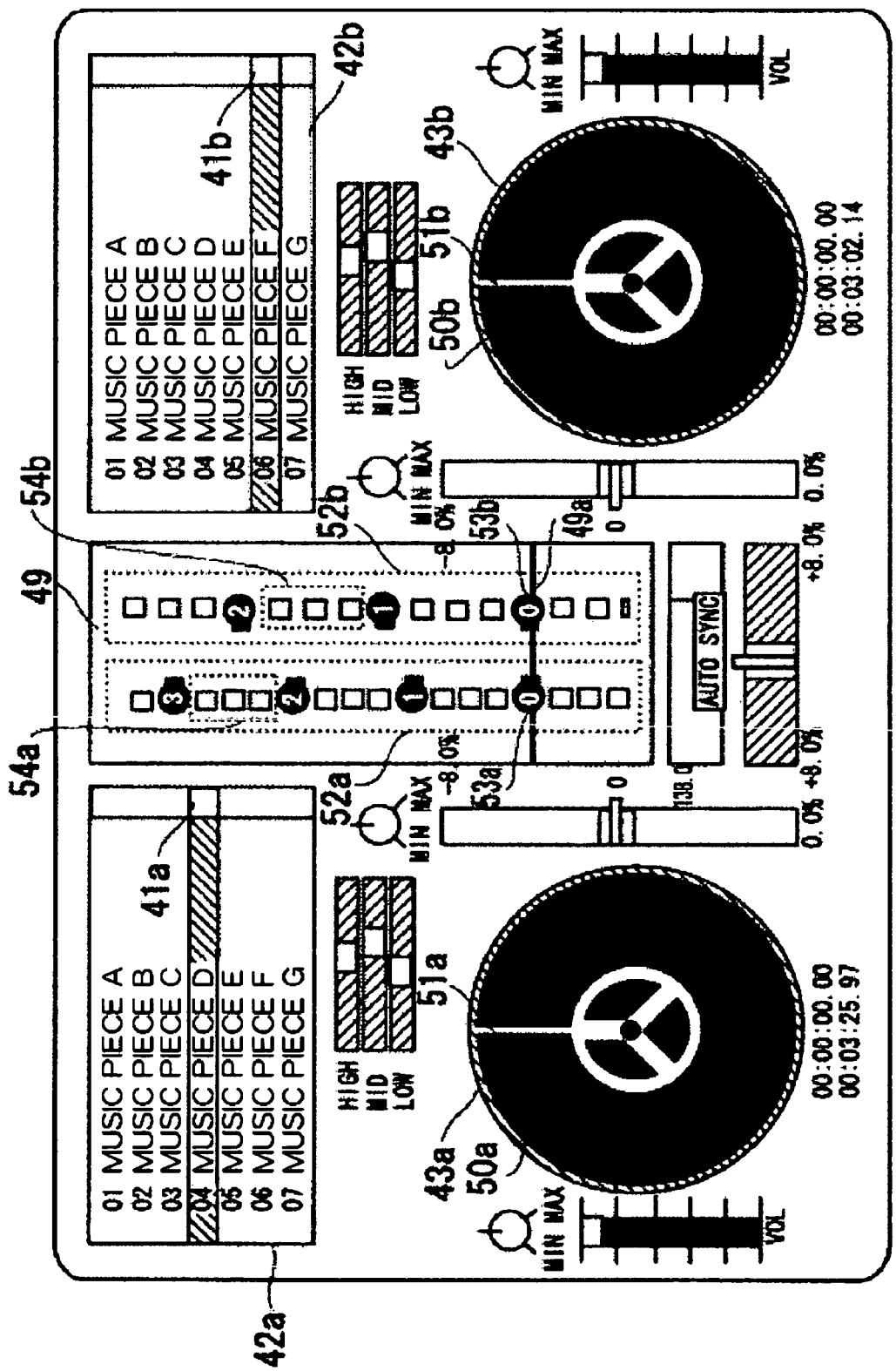
FIG. 7 is a schematic diagram showing a structure of an interface screen on which two music piece data are shown on the right and left sides thereof.

Specifically, as shown in FIG. 7, the control section 1 controls the image processing section 2 according to the interface screen image production code 8*b* so as to display the record object 50*a* or 50*b* indicative of the music piece data 11 of the preceding music piece on either the turn table object 43*a* on the left side or the turn table object 43*b* on the right side. Likewise, the control section 1 controls the image processing section 2 so as to display the record object 50*b* or 50*a* indicative of the music piece data 11 of the subsequent music piece on either the turn table object 43*b* on the right side or the turn table object 43*a* on the left side.

In the state shown in FIG. 7, specifically, the record object 50*a* indicative of the music piece data 11 of the preceding music piece, namely, the music piece D, is displayed on the turn table object 43*a* on the left side, while the record object 50*b* indicative of the music piece data 11 of the subsequent music piece, namely, the music piece F, is displayed on the turn table object 43*b* on the right side.

On the respective record objects 50*a*, 50*b*, there are defined reproduction lines 51*a*, 51*b* indicative of the reproduction positions of the music piece data 11 so that the user can visibly recognize the reproduction positions of the music piece data 11. The reproduction lines 51*a*, 51*b* are displayed as moving according to the reproduction positions of the music piece data 11.

Further, according to the interface screen image production code 8*b*, the control section 1 controls the image processing section 2 so as to respectively display the beat guide objects 52*a*, 52*b*, indicative of the beat timings and the reproduction speeds of the music piece data 11, in the beat guide window 49 as shown in FIG. 7, while referring to the beat guide files 11*b* of the music piece data 11 indicated by the cursors 41*a* and 41*b*.

Specifically, while referring to the beat guide file 11*b*, the control section 1 extracts the beat timing (a reproduction position) of the music piece data 11 for reproduction, and calculates a time interval between the beat sounds as a reproduction speed according to the extracted timing. Thereafter, the control section 1 controls so as to display the beat guide objects 52 (52*a*, 52*b*) comprising a plurality of beat timing display objects 53 (53*a*, 53*b*) and speed display objects 54 (54*a*, 54*b*). As shown in FIG. 7, the beat timing display objects 53 (53*a*, 53*b*) are each arranged in a beat position and have a corresponding beat number (a sequential number assigned to each beat) assigned thereto, and the speed display objects 54 (54*a*, 54*b*) are placed between the adjacent beat timing display objects 53.

It should be noted that, when the beat guide file 11*b* has a command comment added thereto, the control section 1 displays that comment in the position corresponding to the beat to which the command comment is added, in the beat guide object 52.

In the music piece reproduction device in this embodiment, the user can rotate the analogue operation section 23R or 23L to thereby move, through rotation, the reproduction line 51*a* or 51*b* defined on the record object 50*a* or 50*b*. When the user moves the reproduction line 51*a* or 51*b* through rotation, the corresponding beat guide object 52*a* or 52*b* is shown moving.

As described above, by causing the beat timing display object 53*a* or 53*b* shown in the beat guide object 52*a* or 52*b* to coincide with the reproduction line 49*a*, the user can select a beat timing at which to add the command comment.

Figure 8:
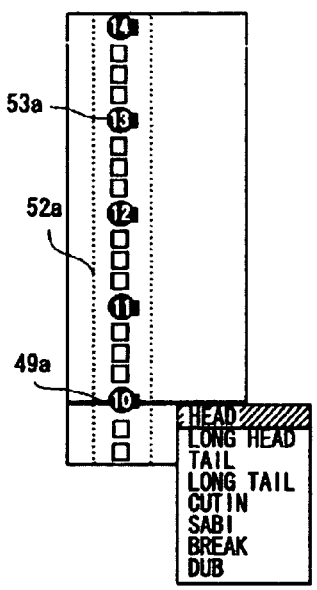
FIG. 8 is a diagram explaining a process to select a command comment which serves as a reservation term and to add to a beat guide file.

When the user presses the right direction instruction key 21*c* with the beat timing display object 53*a* or 53*b* corresponding to the beat timing which the user wishes to select falling on the reproduction line 49*a*, as shown in FIG. 8, the above-described eight kinds of reservation terms (command comments) appear in a pull-down menu format, for example. Then, the user can select any command comment to add to the beat timing by pressing the lower direction instruction key 21*b* or the upper direction instruction key 21*a*. It should be noted that the determination of the addition of a command comment is effected by, for example, further depressing the O button 22*c*.

Here, the meanings of the respective command comments will be described.

HEAD indicates a start position of a four-measure-fade-in. That is, HEAD is a command for introducing a music piece while changing the sound volume thereof from the lowest to a designated sound volume within four measures. The position with the command added thereto indicates a position where such introduction is started.

Likewise, LONG HEAD indicates a start position of a sixteen-measure-fade-in.

TAIL indicates a start position of a four-measure-fade-out.

LONG TAIL indicates a start position of a sixteen-measure-fade-out.

CUTIN indicates a position for cut-in (that is, the reproduction of the ongoing music piece is stopped and the reproduction of the next music piece begins). That is, CUTIN indicates a position at which to switch the music pieces without using a fade effect.

SABI indicates a reference position for application of a predetermined effect to the music piece. That is, SABI indicates a start position of the main subject portion of the music piece, and an effect is applied before and after the position with SABI added thereto.

BREAK means superimposition of another music piece for a sixteen-measure-period from the position indicated by BREAK.

DUB means superimposition over another music piece for a sixteen-measure-period from the position indicated by DUB.

Among these eight kinds of command comments, the command comments CUTIN, HEAD, and LONG HEAD mean that it is desired to begin the reproduction of the music piece in question at the beat timing to which any of these command comments is added, and they are therefore referred to as a start position designation command comment. The command comments TAIL and LONG TAIL mean that the reproduction of the concerned music piece should end at the beat timing to which any of the command comments is added, and they are therefore referred to as an end position designation command comment. An end position designation command comment attached to a preceding music piece and a start position designation command comment attached to the subsequent music piece make a pair which serves as a function indicating a specific method of connection.

In this embodiment, regarding the manner of connection defined by the pair of the end and start position designation command comments, it is determined that a pair which requires a shorter period of time to complete will be given priority. Specifically, when the end position designation command comment is either TAIL or LONG TAIL and the start position designation command comment is CUTIN, basically, the reproduction of the preceding music piece ends at the beat timing to which TAIL or LONG TAIL is attached, and the reproduction of the subsequent music piece begins in a cut-in manner from the beat timing to which CUTIN is attached.

As for the combination of TAIL or LONG TAIL and HEAD or LONG HEAD, a four-measure-cross-fade connection is carried out except for the combination of LONG TAIL and LONG HEAD. As for the combination of only LONG TAIL and LONG HEAD, long mix, that is, a sixteen-measure-cross-fade connection, is carried out.

It should be noted that the number of the start and/or end position designation command comments added in one piece of music is not limited. Specifically, two or more comments HEAD, TAIL, CUTIN or the like may be added in one piece of music. It is also possible to arrange comments in one piece of music such that a start position designation command comment is added to a beat timing after the beat timing to which an end position designation command comment is added, with a specific example thereof in which TAIL is added to the beat timing with beat number 12 and HEAD added to the beat timing with beat number 16.

Further, in the music piece reproduction device in this embodiment, when a start position designation command comment such as HEAD, CUTIN, or the like is added in a music piece, and no end position designation command comment such as TAIL, or the like, is added thereafter, a TAIL comment is automatically inserted at an appropriate position when that music piece is reproduced. Therefore, the user does not need to worry too much about the order of the start and end position designation command comments.

Here, it is possible for an end position designation command comment such as TAIL or the like to be added at a beat timing, for example, which indicates the beginning of a measure which is counted by advancing from the point at which the start position designation command comment is added, by a randomly predetermined number of measures or more.

As described above, as the user can add start and end position designation command comments at desired beat timings in this embodiment, the user can appropriately and readily connect desired reproduction positions of the preceding and subsequent music pieces in the manner desirably selected by the user.

Music Piece Connection and Reproduction Process

The music piece reproduction device in this embodiment can appropriately connect and reproduce a plurality of music piece data 11, as described below, while referring to the command comments added to the respective music piece data 11 and the respective reproduction speeds thereof. It should be noted that in this embodiment, the control section 1 carries out the process described below in accordance with the music piece reproduction processing code 8a, as code for the process to be described later is contained in the music piece reproduction processing code 8a of the music piece reproduction program 8.

Figure 9:
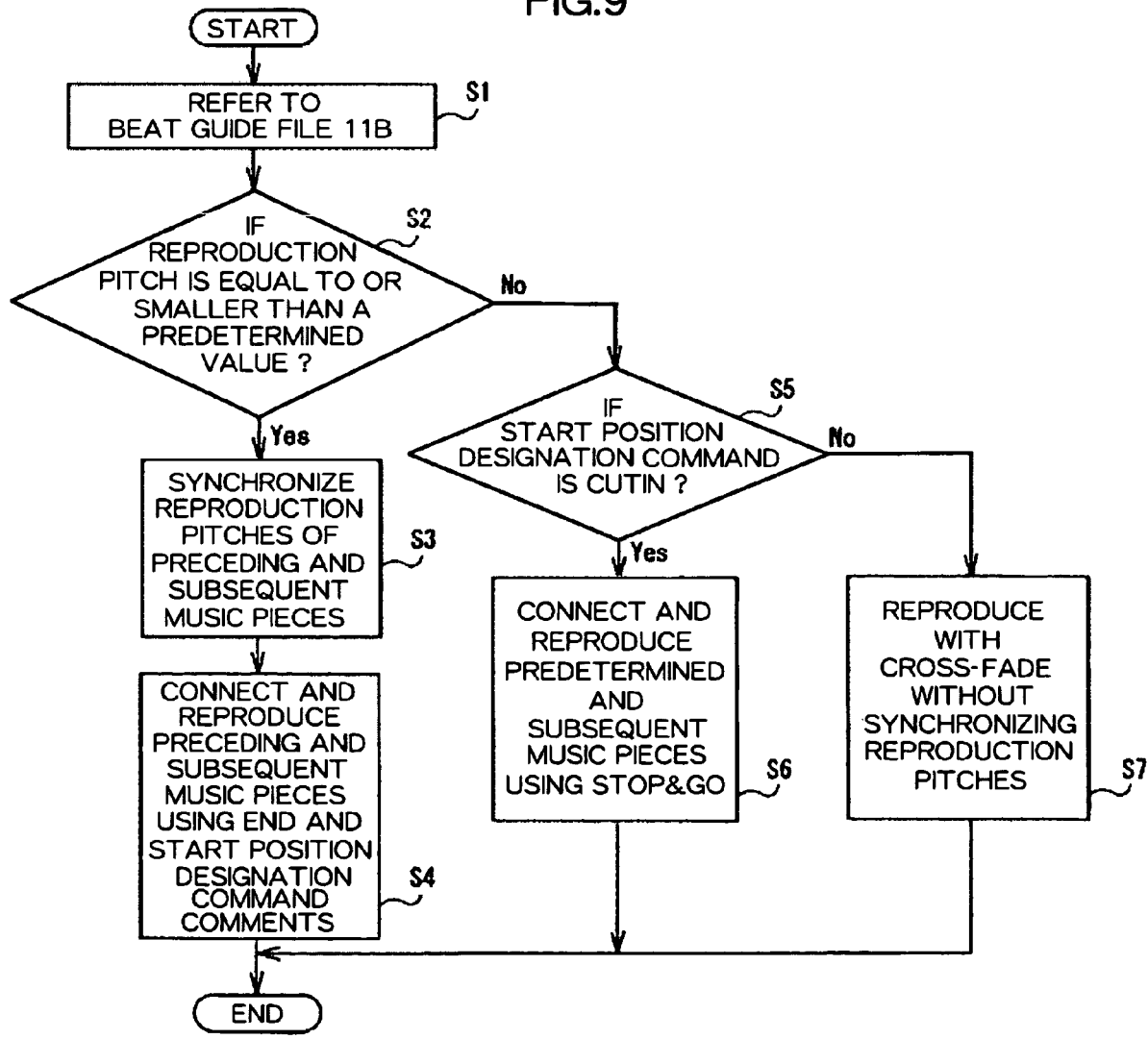
FIG. 9 is a flowchart of a music piece reproduction process in this embodiment.

FIG. 9 is a flowchart of a music piece reproduction process in this embodiment. In the drawing, the control section 1 initially refers to the beat guide files 11b of the preceding and subsequent music pieces (step S1), and determines whether or not the difference between the preproduction speeds of the preceding and subsequent music pieces is equal to or smaller than a predetermined value (step S2). In this embodiment, as the predetermined value is defined as 8%, a determination is made as to whether or not the difference between the reproduction speeds of the preceding and subsequent music pieces is 8%.

In the case where the reproduction speeds of the preceding and subsequent music pieces vary throughout the music pieces, a reproduction speed which is obtained based on a beat timing group comprising a predetermined number of initial beat timings of the beat guide file 11b of each music piece may be used as the reproduction speed of that music piece. The reproduction speed is specified as described above not because no other method enables the process described below, but merely in order to simplify the process to be described below. Therefore, when a complicated process is applicable, the reproduction speed at the time of connection (at fade-in, at fade-out, at cut-in, or the like) may be used as a reproduction speed of that music piece.

When the difference between the reproduction speeds of the preceding and subsequent music pieces is equal to or smaller than 8%, the control section 1 initially performs control such that the reproduction speed of the preceding music piece gradually changes so as to be closer to the reproduction speed of the subsequent music piece (step S3). In this embodiment, the maximum amount of the change of the reproduction speed of the preceding music piece is limited up to 2%. When the reproduction speeds of the preceding and subsequent music pieces are not synchronized with each other even when the reproduction speed of the preceding music piece is changed by an amount up to 2%, the reproduction speed of the subsequent music piece is then changed so that the two music pieces are synchronized.

As described above, the reproduction speed/speeds of the preceding and/or subsequent music pieces are changed such that the reproduction speeds of the preceding and subsequent music pieces coincide with each other when the desired reproduction ending position of the preceding music piece which is indicated by TAIL or LONG TAIL coincides with the desired reproduction start position of the subsequent music piece which is indicated by CUTIN, HEAD, or LONG HEAD. It should be noted that a method for changing the reproduction speed is realized by a widely known process, such as by changing the speed to read the music piece data, or the like.

Further, as described above, the control section 1 performs controls so as to synchronize the reproduction speeds of the preceding and subsequent music pieces when the desired reproduction ending position of the preceding music piece coincides with the desired reproduction start position of the subsequent music piece as described above, and also so as to realize a manner of connection which is defined by the combination of the end position designation command comment added to the preceding music piece and the start position designation command comment added to the subsequent music piece (step S4).

For example, in the case where the end position designation command comment added to the preceding music piece is LONG TAIL and the start position designation command comment added to the subsequent music piece is LONG HEAD, a cross-fade connection is carried out with the reproduction speeds of the preceding and subsequent music pieces remaining synchronized with each other for over sixteen measures. Also, in the case where the end position designation command comment added to the preceding music piece is TAIL or LONG TAIL and the start position designation command comment added to the subsequent music piece is CUTIN, a cut-in connection is carried out with the reproduction speeds of both of the music pieces remaining synchronized with each other.

Here, suppose that, for example, the reproduction speed of the preceding music piece is 180 (that is, a speed capable of reproducing 180 notes during one minute, each sound having a length corresponding to a crotchet, to be applied also in the descriptions below), that of the subsequent music piece is 168, and that of a music piece to be reproduced after the subsequent music piece (a further subsequent music piece) is 178. In this case, in application of a process to synchronize the reproduction speeds as described above, the preceding and subsequent music pieces may be connected with each other, while being synchronized, on the assumption that the reproduction speed of the subsequent music piece is 174, that is, a speed faster than the original reproduction speed thereof, or 168, and slower than the reproduction speed of the further subsequent music piece, or 178.

After the preceding and subsequent music pieces are synchronized with each other as described above and reproduction is shifted to the subsequent music piece, the subsequent music piece is reproduced at the reproduction speed 174.

The above is a description about a process to be applied in the case where the reproduction speed of the preceding music piece is faster than that of the subsequent music piece and the reproduction speed of the further subsequent music piece is also faster than that of the subsequent music piece. Specifically, in such a case, the subsequent music piece is reproduced at a speed faster than the original reproduction speed of the subsequent music piece.

Likewise, in the case where the reproduction speed of the preceding music piece is slower than that of the subsequent music piece and the reproduction speed of the further subsequent music piece is also slower than that of the subsequent music piece, the subsequent music piece may be reproduced at a speed slower than the original reproduction speed of the subsequent music piece.

Meanwhile, when the difference between the reproduction speeds of the preceding and subsequent music pieces is not equal to or smaller than 8%, the control section 1 connects these music pieces without synchronizing the reproduction speeds thereof.

Specifically, when the difference between the reproduction speeds of the preceding and subsequent music pieces is not equal to or smaller than 8%, the control section 1 determines in step S5 whether or not the start position designation command comment embedded in the subsequent music piece is CUTIN.

When it is determined that the start position designation command comment of the subsequent music piece is CUTIN, the control section 1 connects these music pieces by means of "Stop+Go" (stop-and-go) (step S6).

"Stop+Go" as referred to here is a manner of connection in which the reproduction of the preceding music piece ends at the fourth measure counted by advancing from the position to which the end position designation command comment of the preceding music piece is attached, and after an interval of one pause, the reproduction of the subsequent music piece begins normally from the position to which the start position designation command comment is attached.

Alternatively, "Fadeout+Cutin" (fade-out and cut-in) may be applied instead of "Stop+Go" in the above. "Fadeout+Cutin" as referred to here is a manner of connection in which the reproduction of the preceding music piece is faded out for over three measures, and after an interval of one measure, the subsequent music piece is inserted by means of cut-in into the head position of the next measure.

When the difference between the reproduction speeds of the preceding and subsequent music pieces is not equal to or smaller than 8%, and the start position designation command comment of the subsequent music piece is not CUTIN, the control section 1 performs controls in step S7 so as to connect the preceding and subsequent music pieces by means of a cross-fade over four measures without synchronizing the respective reproduction speeds.

As described above, according to an embodiment of the present invention, two music pieces can be readily and appropriately connected to each other and reproduced utilizing the command comment.

Here, it may be anticipated that as the user repeats successive reproduction of a plurality of music pieces while connecting them, they may begin to wonder what kind of music pieces other people connect and reproduce, and in what order, or what kind of music piece is highly likely to be used before or after a certain music piece.

As a play list showing the kinds of music pieces reproduced and the order of reproduction thereof is prepared in this embodiment, the user's desire as described above can be satisfied by sharing the play list with other people.

Figure 10:
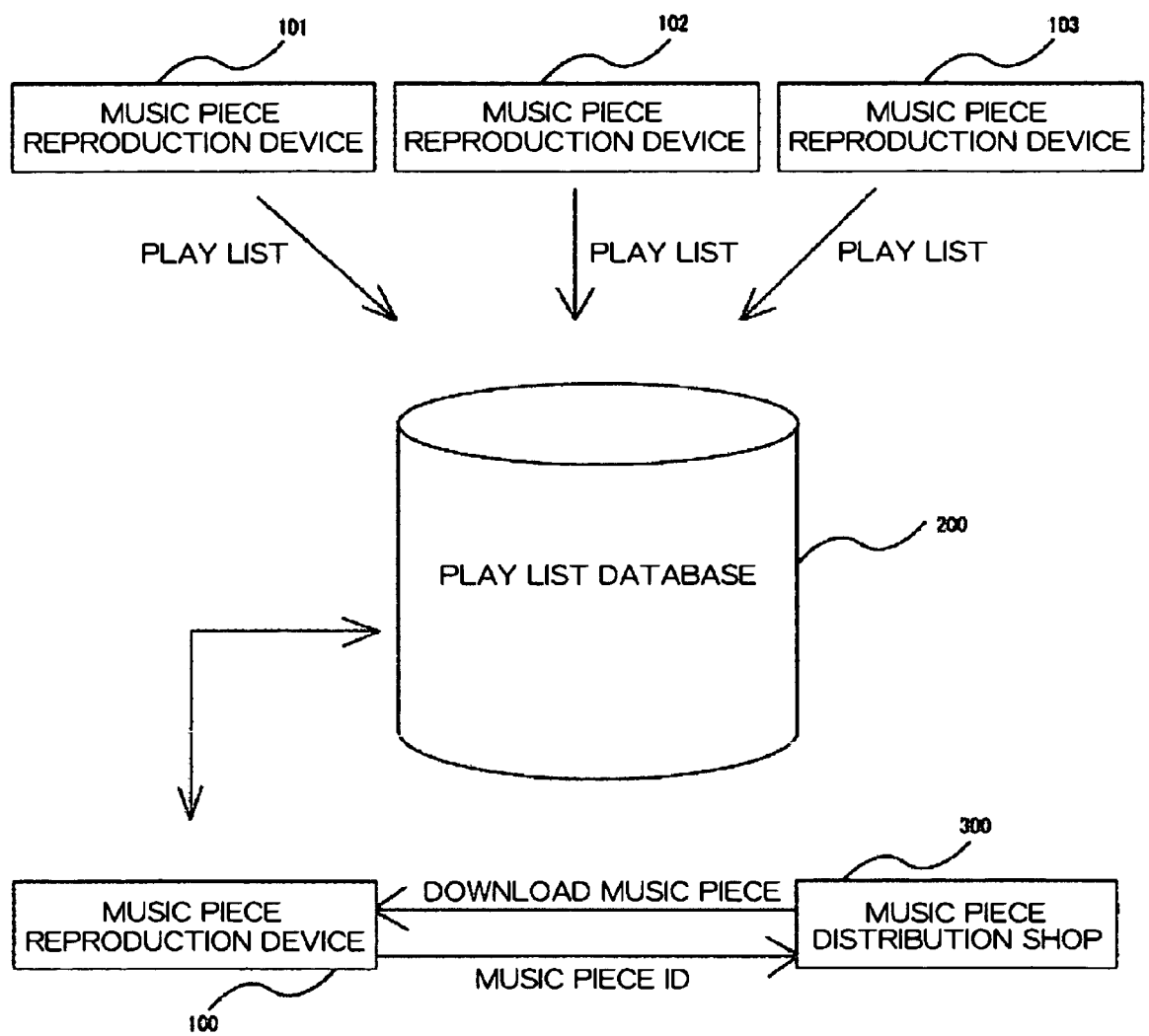
FIG. 10 is a diagram explaining a method for obtaining a music piece so as to enable exchange of a play list and reproduction as shown in the play list.

Specifically, as shown in FIG. 10, the control section 1 of the music piece reproduction device 100 in this embodiment controls the communication section 14 so as to send the play list to a play list database 200 via an electrical communication line automatically or in response to the user's instruction. Likewise, the music piece reproduction devices 101, 102, 103 for use by other users also send play lists to the play list database 200 where the play lists are accumulated. In this manner, information on the kinds of music pieces reproduced and the reproduction orders is accumulated in the play list database 200. Therefore, the user, while referring to the play list database 200, can know what kind of music pieces are connected for reproduction, and in what order, by other users, or what kind of music pieces are highly likely to be used before or after a certain music piece.

In addition, in the case where a play list prepared by a notable person should be registered in the play list database 200, the user can acquire that play list from the play list database 200 and enjoy the reproduction of the plurality of music pieces selected by the notable person in the order determined by the notable person.

When the user obtains the play list prepared by other users or the like and is about to enjoy the music piece reproduction process using the play list, as described above, it may happen that the user finds out that they do not have some of the music pieces included in the play list. In such a case, the control section 1 controls the communication section 14 so as to send the music piece ID, or an ID of a music piece which the user does not have to a music distribution shop or an EMD (Electronic Music Distribution) shop, so that the user can purchase or download the music piece corresponding to that music piece ID from the music distribution shop or EMD shop.

Further, when the play list can be distributed as being associated with a group of command comments which are input when the music pieces listed in the play list are reproduced, the user can enjoy the DJ mix prepared by other players or a notable person, for example. That is, the music piece reproduction device 100 successively reproduces, while connecting, the plurality of music pieces based on the acquired play list and the group of command comments.

In the above, it may happen, during the reproduction of the music pieces (DC mix), that the user wishes to omit the music piece currently being played and listen to the following music piece. In this case, however, employment of a simple arrangement in which the ongoing reproduction of the music piece is stopped and the reproduction of the next music piece begins from the beginning thereof may deteriorate the DJ-like atmosphere, and the user cannot enjoy the successive reproduction of the music pieces.

Therefore, in this embodiment, in response to the user's instruct requesting to start reproduction of the next music piece, the command comment HEAD or LONG HEAD is inserted to the head of the music piece to be next reproduced, and the command comment TAIL or LONG TAIL is inserted to the next beat timing of the ongoing music piece. With this arrangement, a cross-fade connection is carried out from the currently reproduced music piece to the next music piece, so that the music pieces are successively reproduced. It should be noted that the length of a cross-fade period (whether to use HEAD and TAIL or LONG HEAD and LONG TAIL) may be determined in advance by the user.

Where an embodiment of the present invention has been described above, it should be noted that the present invention is not limited by any description or drawing which is a part of the disclosure of the embodiment of the present invention. For example, although whether or not to synchronize the reproduction speeds is determined based on whether or not the difference between the reproduction speeds of the preceding and subsequent music pieces is equal to or smaller than 8% in the above embodiment, the predetermined value may be set changeable and changed for every genre.

As described above, according to an embodiment of the present invention, a command comment is added to the beat guide file which possess a reproduction speed and a beat timing of music piece data, and the sound data files of the preceding and subsequent music pieces are connected to each other according to the content of the command comments, so that the preceding and subsequent music pieces are successively reproduced.

For example, when an end position designation command comment indicative of a desired reproduction ending position of the preceding music piece is added to the beat guide file of the preceding music piece and a start position designation command comment indicative of a desired reproduction start position of the subsequent music piece is added to the beat guide file of the subsequent music piece, successive reproduction of the preceding and subsequent music pieces can be readily achieved by adjusting, while utilizing the comment commands, such that the desired reproduction ending position of the preceding music piece coincides with the desired reproduction start position of the subsequent music piece.

The present invention is not limited to the above-described embodiment, and can be modified in a variety of manners within the scope defined by the claims of the present invention, and such modifications are obviously included in the scope of the present invention.

Also, in this specification, a "section" does not always refer to a physical means, and a case in which the function of the relevant section is realized by use of software is also included. Further, the function of one section may be achieved using two or more physical means, and the functions of two or more sections may be achieved using one physical means.

A second embodiment of the present invention will be described while referring to the accompanying drawings.

In the second embodiment, an example will be described in which a first device for recording and reproducing a TV program and/or music and a second device for realizing the function as a consumer game machine are combined. The composite device in the second embodiment can select either a first or second mode as an activation mode. The composite device, when activated in the first mode, functions mainly as a device for recording and reproducing videos and music, and when activated in the second mode, functions mainly as a consumer game machine.

Figure 11:
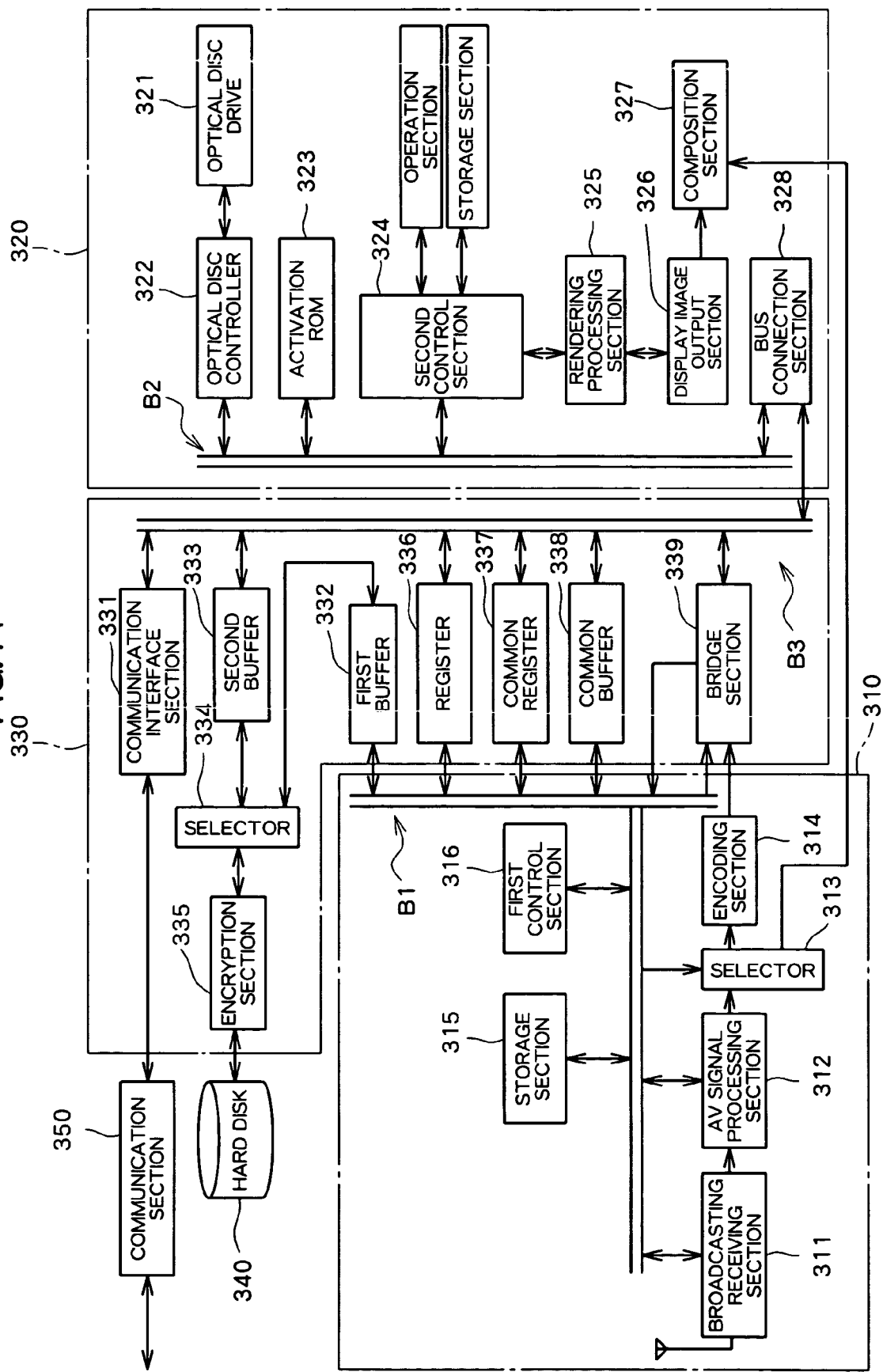
FIG. 11 is a structural block diagram showing one example of a composite device in a second embodiment of the present invention.

The composite device in the second embodiment is constructed comprising, as shown in FIG. 11, a first device section 310, a second device section 320, a common section 330, a hard disk 340, and a communication section 350, in which all of these elements may be accommodated in a single enclosure.

Here, the first device section 310 and the common section 330 are mutually connected via a first bus B1. The second device section 320 has a second bus B2 which is connected to the third bus B3 of the common section 330 for mutual communication.

The first device section 310 comprises a broadcasting receiving section 311, an audio video (AV) signal processing section 312, a selector 313, an encoding section 314, a first storage section 315, and a first control section 316. The second device section 320 comprises an optical disc drive 321, an optical disc controller 322, an activation ROM 323, a second control section 324, a rendering processing section 325, a display image output section 326, a composition section 327, and a bus connection section 328.

The common section 330 comprises a communication interface section 331, a first buffer 332, a second buffer 333, a selector 334, an encryption section 335, a register 336, a common register 337, a common buffer 338, and a bridge section 339.

Figure 12:
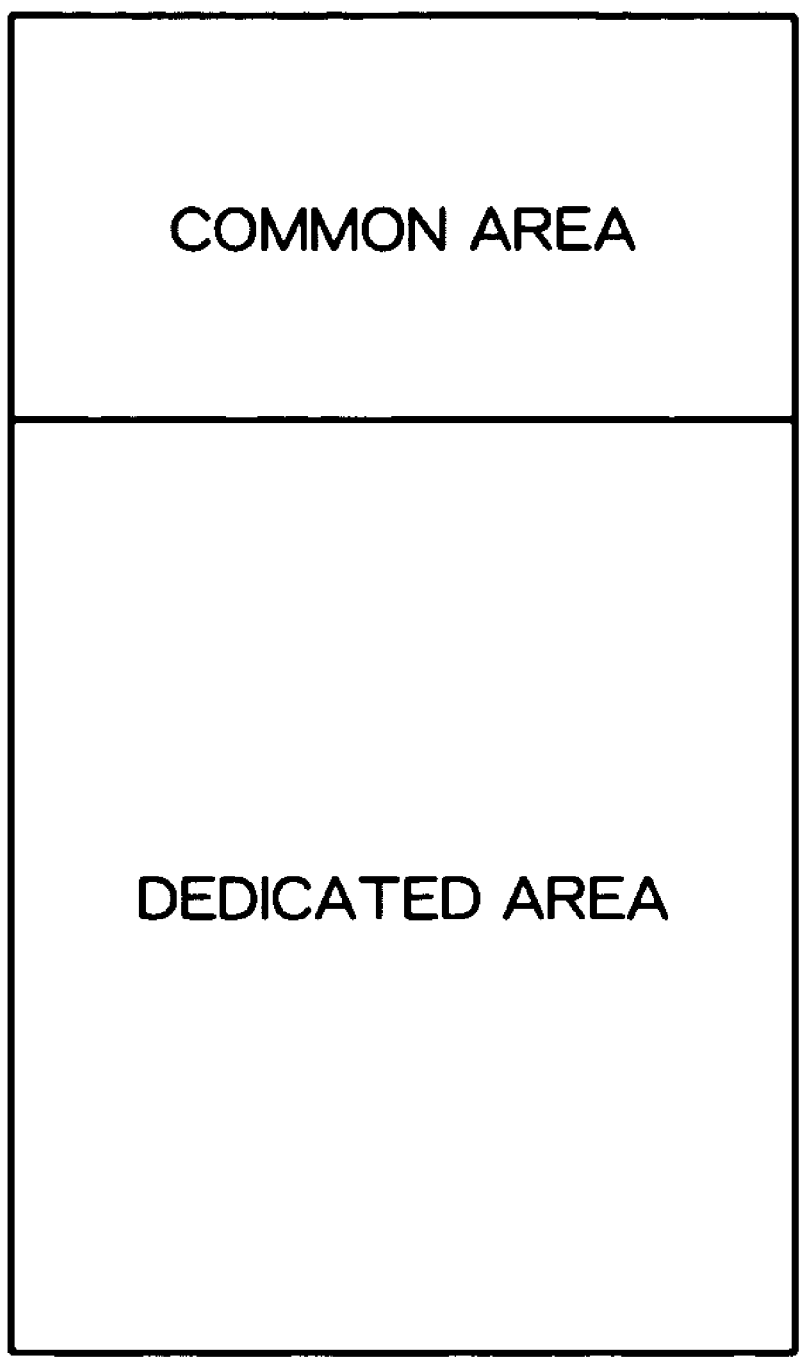
FIG. 12 is a diagram explaining an example of an area ensured in a hard disk.

Here, the storage area of the hard disk 340 includes a common area and a dedicated area, with the outline thereof being shown in FIG. 12. With respect to the hard disk 340, data is written or read via the first device section 310. That is, the first device section 310 receives a data writing and reading request (an access request) from the second device section 320, and in response to that request, carries out a data writing and reading process with respect to the hard disk 340.

Also, in response to a request from the second device section 320 asking for an access to the common area, the first device section 310 carries out a process according to that request. However, in the case where a request for an access to the dedicated area is made, the second device section 320 does not respond to the request. That is, an access is prohibited. Specifically, these areas in the hard disk 340 can be realized by setting a partition in the hard disk 340.

The broadcasting receiving section 311 of the first device section 310 selectively receives, from signals arriving at the antenna, a signal of a broadcasting station which is selected according to the user's station selection operation, and outputs the selected signal to the AV signal processing section 312. It should be noted that the user's station selection operation is carried out using an operation section (not shown). The content of the station selection operation is, for example, input to the second control section 324 of the second device section 320, and further to the first control section 316 and the broadcasting receiving section 311 via the common section 330 and the first bus B1.

The AV signal processing section 312 receives the signal of the broadcasting station input from the broadcasting receiving section 311, reproduces the video and sound signals thereof, and outputs to the selector 313. The AV signal processing section 312 reproduces the video and sound signals based on the video data input from the first bus B1, and outputs the result to the selector 313.

The selector 313 determines whether or not to output the signal input from the AV signal processing section 312 to the encoding section 314 based on the selection signal input from the first control section 316. The selector 313 also determines whether or not to output the signal input from the AV signal processing section 312 to the composition section 327 of the second device section 320 based on the selection signal input from the first control section 316.

Specifically, when it is intended to record a television broadcasting program in a DVD, the selector 313 is controlled so as to output the signal input from the AV signal processing section 312 to the encoding section 314 because the video signal or the like needs to be encoded. Meanwhile, when it is intended to reproduce the video and music recorded in a DVD or the hard disk 340, the selector 313 is controlled so as to output the signal input from the AV signal processing section 312 to the composition section 327 of the second device section 320.

The encoding section 314, having received the video and sound signal input, encodes the received signal into data in conformity with the MPEG (Motion Picture Experts Group) standard, for example, and outputs the result to the bridge section 339 of the common section 330.

The first storage section 315, which is constructed comprising a memory element such as a RAM (Random Access Memory) or the like, holds a program to be executed by the first control section 316. The first storage section 315 also functions as a work memory for holding a variety of data which are necessary in the process by the first control section 316.

The first control section 316, which is a CPU or the like, operates according to a program stored in the first storage section 315, and carries out a process to record a variety of data in the hard disk 340. In the second embodiment, the second device section 320 is not allowed to directly access the hard disk 340 but to access via the first device section 310. This arrangement is employed in order to prevent occurrence of competition in an arrangement in which the hard disk is shared by a plurality of devices, and also to maintain compatibility between the consumer game machine which is the second device section 320 and an old-type consumer game machine (that is, a game device lacking a hard disk access function).

The first control section 316 also carries out a variety of processes to control the first device section 310, including a process to control the selector 313 so as to encode video and sound signals, or the like. Further in the second embodiment, the first control section 316, when activated in the first mode, converts the data for processing recorded in the hard disk 340 into a predetermined format, and stores the converted data in the common area in the hard disk 340 (see FIG. 12) (a data conversion process). The specific contents of these processes by the first control section 316 will be described later.

The optical disc drive 321 of the second device section 320, which is a DVD drive, for example, can write data in an optical disc of a variety of DVD standards, including a DVD-R, DVD-RW, or the like. The DVD drive also can read data from an optical disc or the like of a DVD or CD standard. As the optical disc driver mentioned above, a widely known optical disc drive can be employed.

The optical disc controller 322 controls the optical disc drive 321 for data writing and reading. In the second embodiment, the second device section 320, which realizes the function as a consumer game machine, carries out a game process based on game software recorded in the DVD-ROM or the like. Specifically, the optical disc controller 322 reads data of the game software and outputs the read data to the second control section 324. The optical disc controller 322 also outputs the data read from the DVD, CD, or the like, to the AV signal processing section 312 of the first device section 310 via the common section 330.

The activation ROM 323 is read using the second control section 324. In the activation ROM 323, a program (a boot program) for activating the second device section 320, which serves as a consumer game machine, reading a game program, and starting a game, is stored.

The second control section 324, which can be realized by a CPU, reads a boot program from the activation ROM 32 upon receipt of an instruction requesting activation in the second mode. Thereafter, the second control section 324 controls the optical disc controller 322 based on the boot program so as to read a game program therefrom and to execute the game program read.

The second control section 324, while being activated in the first mode, produces an image to be displayed on a screen according to an instruction input from the first device section 310. Further, the second control section 324, having received the content of the user's instruction operation from an operation section (not shown), carries out a predetermined process based on the content of the received instruction operation. The specific content of the process to be carried out by the second control section 324 will be described later.

The rendering processing section 325, which is specifically an information processing element such as a GPU (Graphics Processing section), produces an image to be displayed according to an instruction input from the second control section 324, and outputs the produced image to the display image output section 326. Further, the rendering processing section 325 in the second embodiment, having received data subjected to MPEG encoding, decodes the data to thereby produce video and sound data, and outputs to the display image output section 326. In the composite device in the second embodiment, the first device section 310 and the second device section 320 both utilize the rendering processing section 325 when displaying user interface screen images such as an operation menu, or the like.

The display image output section 326 converts the video and sound data output from the rendering processing section 325 into video and sound signals which can be received by the TV receiver side before output. Specifically, the image data output by the rendering processing section 325 is converted into an RGB or composite signal before output.

The composition section 327 composites (superimpose) the video signal output from the display image output section 326 and the video signal output from the selector 313 before output. In addition, the sound signal output from the display image output section 326 and the sound signal output from the selector 313 are composited (mixed) before output. The signal output from the composition section 327 is input into a TV receiver or the like to be shown on a screen of the TV receiver or output as a sound from the speaker of the TV receiver, or the like.

A bus connection section 328 is connected between the second bus B2 and the third bus B3, and relays data output from the second device section 320 to the common section 330. The bus connection section 328 also relays data output from the common section 330 to the second device section 320.

The communication interface section 331 of the common section 330 is connected to the communication section 350, and outputs the data received by the communication section 350 via the third bus B3. The communication interface section 331 also receives the data to be transmitted via the communication section 350 via the third bus B3 and outputs the received data to the communication section 350.

The first buffer 332 is a DMA (Direct Memory Access) buffer for holding data to be exchanged with the first control section 316. The second buffer 333 is a DMA (Direct Memory Access) buffer for holding data to be exchanged with the second control section 324. The selector 334 is controlled by a signal input from the first control section 316, and connects either one of the first buffer 332 and the second buffer 333 to the encryption section 335.

The encryption section 335 encrypts the data input via the selector 334 and stores in the hard disk 340. The encryption section 335 also decodes the data read from the hard disk 340 to output to the selector 334. That is, when the encryption section 335 is connected to the first buffer 332 via the selector 334, in an attempt to write data into the hard disk 340, the encryption section 335 encrypts the data stored in the first buffer 332 and stores this data in the hard disk 340. Meanwhile, in an attempt to read data from the hard disk 340, the encryption section 335 decodes the data read from the hard disk 340 and stores decoded data in the first buffer 332.

Likewise, when the encryption section 335 is connected to the second buffer 333 via the selector 334, in an attempt to write data into the hard disk 340, the encryption section 335 encrypts the data stored in the second buffer 333 and stores encrypted data in the hard disk 340. Meanwhile, in an attempt to read data from the hard disk 340, the encryption section 335 decodes the data read from the hard disk 340 and stores the decoded data in the second buffer 333.

The register 336 is a register into which command and control data for use in accessing the hard disk 340 by the second control section 324 are written. Specifically, when the hard disk 340 is connected using an IDE (Integrated Device Electronics) method (for example, a standard such as ATA or the like), the register 336 operates as one type of an IDE register. For the purpose of accessing the hard disk 340, a writing or reading command and control data describing a data writing and reading speed and so forth are written in advance in the register 336.

As described above, in the second embodiment, the hard disk 340 is allowed to be accessed only from the first device section 310. That is, in the second embodiment, the first control section 316 of the first device section 310 transfers the reading and writing request relating to the hard disk 340 which is sent from the second device section 320 to the IDE register in the hard disk 340 while referring to the content stored in the register 336. It should be noted that data writing and reading to and from the hard disk 340 is carried out according to the command and control data stored in the IDE register in the hard disk 340.

The common register 337 and the common buffer 338 are utilized in data exchange between the first device section 310 and the second device section 320. For example, the second control section 324 stores the information describing the content of an instruction operation input from the operation section (not shown), in the common buffer 338, and the first control section 316 reads the information from the common buffer 338 to thereby receive the instruction operation.

The bridge section 339 transfers the data output from the encoding section 314 to either one of the first bus B1 and the third bus B3 based on a selection control signal input from the first control section 316.

The communication section 350, which may be a modem or a network card, for example, sends the data input from the communication interface section 331 via a network after modulation or the like. The communication section 350 also demodulates the data received via a network to output to the communication interface section 331.

The composite device in the second embodiment is constructed comprising the above described structure and operates as described below. As the operations of the first and second control sections 316, 324 are different depending on the respective operations, the respective cases will be described below.

Initially, an operation when the composite device is activated in the first mode will be described.

In the first mode, the second device section 320 transmits the user's instruction operation to the first device section 310, and carries out a process to produce and display an interface screen image in response to a request from the first device section 310. The first device section 310 carries out a process such as to record a TV video or the like into the hard disk 340.

The first control section 316 controls the selector 313 so as to output a signal output from the AV signal processing section 312 to both of the encoding section 314 and the composition section 327. The first control section 316 also outputs a selection control signal to the bridge section 339 so as to output the data output from the encoding section 314 to the first bus B1.

With this arrangement, the video and sound signal received by the broadcasting receiving section 311 and output by the AV signal processing section 312 is encoded by the encoding section 314 into MPEG data and then output via the bridge section 339 to the first bus B1. This data is then held by the first buffer 332.

The first control section 316 controls so as to store a writing request in the IDE register in the hard disk 340 and also connect the selector 334 to the first buffer 332. With this arrangement, the data held in the first buffer 332 is encrypted by the encryption section 335 and recorded in the hard disk 340. It should be noted that the first control section 316 controls so as to write the data subjected to MPEG encoding into the dedicated area among the partitioned areas in the hard disk 340.

It should be noted that under this condition, the second control section 324 that has received the user's instruction operation, carries out a process to transmit to the first device section 310, and also a process to render a user interface screen image on the screen in response to an instruction sent from the first device section 310.

In the following, a process to be carried out by the composite device in the second embodiment to import data from a CD and record in the hard disk 340 will be described. This process is widely known as a ripping process. Also in this operation, the first device section 310 mainly operates (that is, in a situation in which the first device is activated).

The first control section 316 exchanges various information with respect to the second control section 324 of the second device section 320, including the content of the user's instruction operation, an instruction directed to the optical disc controller 322, and data or the like output from the optical disc controller 322.

Specifically, the first control section 316 instructs the second control section 324 (via the common buffer 338) so as to cause the optical disc controller 322 to read data. Then, the second control section 324 instructs the optical disc controller 322 to read data, and in response to the instruction, the optical disc controller 322 drives the optical disc drive 321 to read sound data from the optical disc (a CD, here) which is set therein, and outputs to the second control section 324. The second control section 324 transfers the sound data via the common buffer 338 to the first control section 316.

The first control section 316 outputs the transferred sound data to the AV signal processing section 312 to have the AV signal processing section 312 to produce a sound signal, and also controls the selector 313 so as to output the produced sound signal to the encoding section 314. In the encoding section 314, the sound signal is subjected to MPEG encoding (converted into MP3) to thereby produce MP3 data. It should be noted that although an example in which the signal is encoded into MP3 format is described here, the manner of encoding is not limited to this example.

The MP3 data out from the encoding section 314 is output via the bridge section 339 to the first bus B1, and then held in the first buffer 332.

The first control section 316 stores a writing request in the IDE register in the hard disk 340 and connects the selector 334 to the first buffer 332. With this arrangement, the MP3 data held in the first buffer 332 is encrypted by the encryption section 335 and recorded in the hard disk 340. It should be noted that the first control section 316 controls so as to write the MP3 data in a dedicated area among the partitioned areas in the hard disk 340. In the above, the first control section 316 determines the file name of the MP3 data either randomly or by referring to the information on the music piece names acquired from the CDDB (a CD database) or the like via the network.

Further, upon receipt of the user's instruction operation (an instruction requesting to start a game using the data recorded in the dedicated area) requesting to start a game using the data stored in the dedicated area in the hard disk 340, that is, the MPEG data including video and sound, and the MP3 data imported from an audio CD, the first control section 316 begins the process described below.

That is, the first control section 316 reads an activation process program (a first program) for a game which uses the data recorded in the dedicated area, the program being stored in the optical disc (DVD-ROM or the like) set in the optical disc drive 321 or in the storage section 315, and begins the first program.

Figure 13:
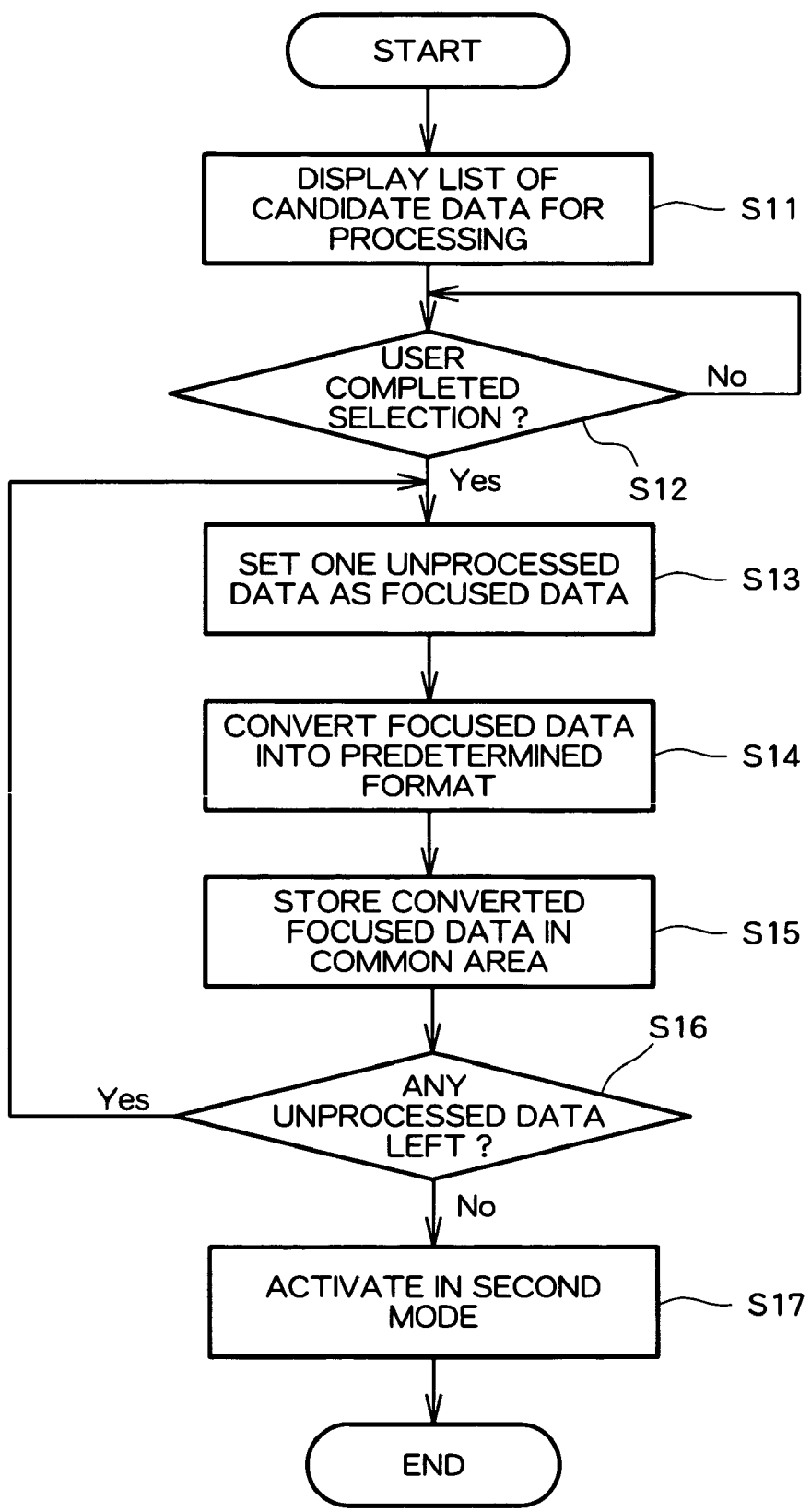
FIG. 13 is a flowchart of an exemplary operation of a composite device in the second embodiment of the present invention.

In this process, as shown in FIG. 13, initially, candidates for the data for processing are read from the dedicated area, and a list showing the read candidates is shown on the screen (S11). Specifically, in the case of a game using MP3 data, an instruction is given to the second control section 324 so as to prepare a list showing the names of the files of the MP3 data stored in the dedicated area, and then to show a menu screen for selection of the data for processing from the list.

Thereafter, the user's selection of the data for processing on the displayed menu screen and execution of an instruction operation telling completion of the selection is waited (S12). Upon completion of the selection, the following process is carried out for the selected data as an object for processing.

That is, among the selected data, one piece of (unprocessed) data which is yet to be processed as focused data is determined as focused data (S13), and converted into data in a predetermined format (data conversion process, S14). Here, data in a predetermined data format may be a result of encoding of data of the same kind in a different manner, such as an ADPCM format relative to MP3 data, for example. As for video data, data in a predetermined format may be data obtained by converting an image in one frame in the motion images (for example, the frame may be selected by the user) into a still image.

The first control section 316 stores the converted data in the common area in the hard disk 340 (S15), and then determines if there is any selected data left which is yet to be processed as focused data (S16). When it is determined that there is some unprocessed data left (Yes), the process returns to step S13 to continue the process therefrom. Meanwhile, when it is determined in step S16 that there is no unprocessed data left (No), a process to activate in the second mode is carried out (S17) before the process ends.

It should be noted that, as for the data which is stored in the common area in step S15, the first control section 316 may produce a database which holds the management information on the data, and store in the common area. This database specifically holds the names of the music pieces, artists, albums, genres, performance periods of time, and so forth, as information obtainable from the CDDB, CD itself, or the like.

In displaying the list of the data read out from dedicated areas in step S11, the first control section 316, while referring to the database, excludes the data which is identical to the data having been converted and stored in the common area, from the list. This arrangement can prevent duplicate conversion.

The first control section 316 may also display a list of the data held in the database (for example, a list of the names of the music pieces). In the above, it is possible to accept an instruction for deleting the data in the common area from the data list.

It should be noted that the determination of the sameness of the data stored in the dedicated area and the data stored in the common area is made by comparing the names of the respective music pieces and/or artists.

The process to activate the second mode in step S17 specifically means a process or the like to reset the composite device itself by generating an interrupt, and in addition to cause the second control section 324 to execute a boot program.

When activated in the second mode, the second control section 324 executes a boot program and reads the main program of a game (a second program) stored in the optical disc which is set in the optical disc drive 321. Here, in the case where the second program is a program which uses the data stored in the common area in the hard disk 340, the second control section 324 operates as follows, for example.

In this embodiment, the first and second programs may be stored in a single storage medium (for example, one optical disc). This arrangement eliminates the need for a process to exchange the discs at the time of reactivation, as a result of which convenience can be improved. For this purpose, if the data is read as a program from a specified position (a sector or the like), for example, by use of a boot program of the second device section 320 on the storage medium, the second program is stored in advance in the specified position.

According to an instruction of the second program, the second control section 324 carries out processes including a process to read data from the common area in the hard disk 340 (for example, the ADPCM data converted from the MP3) and the database of the management information, a process to display the list of music piece names, a process to display, upon receipt of the user's selection, the selected ADPCM data either intact or at a changed reproduction speed, and a process to reproduce, upon receipt of a plurality of ADPCM data pieces selected, mixed sound signals (in this case, at least one of the reproduction speeds may be modified such that all reproduction speeds coincide with one another), and so forth.

During this period, the first control section 316 of the first device section 310 may carry out a process to store the MPEG data which is produced based on a television signal, for example, in the hard disk 340.

According to the composite device in the second embodiment, with an arrangement in which the data which can be processed by the first device section 310 can also be used by the second device section 320, advantages can be produced including development of a variety of games, for example.

Here, if it is assumed that there is available a technique for enabling, for example, ready adjustment of the reproduction speeds and/or reproduction start positions of a plurality of music pieces and facilitation of reproduction in a synchronized manner, it will be possible to apply such a technique and to carry out combination reproduction using a predetermined algorithm. However, combination reproduction using only a predetermined algorithm may result in too monotonous.

Generally, in play by a DJ, the beauty of the selection of music pieces and/or a combination reproduction method which rely on the unique sensitivity of each DJ can be enjoyed. In this view, combination reproduction using a method based on a predetermined algorithm alone may appear as if the music pieces were always reproduced by the same DJ. This is not appealing and implies a lack of entertaining innovation.

In order to address this situation, a plurality of algorithms may be prepared in advance so that the user can freely select a desired one. However, this arrangement may appear as if one DJ were called on from those in the list of DJs prepared, which lacks human spontaneity, such as encounter with a new DJ, with little entertaining innovation being implied.

In addition, like a DJ with music pieces, video jockeys, or VJs, are recently available for combining and reproducing videos. The above described problems are also true with VJ.

Therefore, a reproduction device which can enhance the entertainment nature when combining and reproducing music pieces or videos is desired. With this in mind, in the following a third embodiment of the present invention will de described while referring to the accompanying drawings. It should be noted that although a case in which music piece data is used is mainly described here, a similar process is also applicable to a case in which video data is used.

Figure 14:
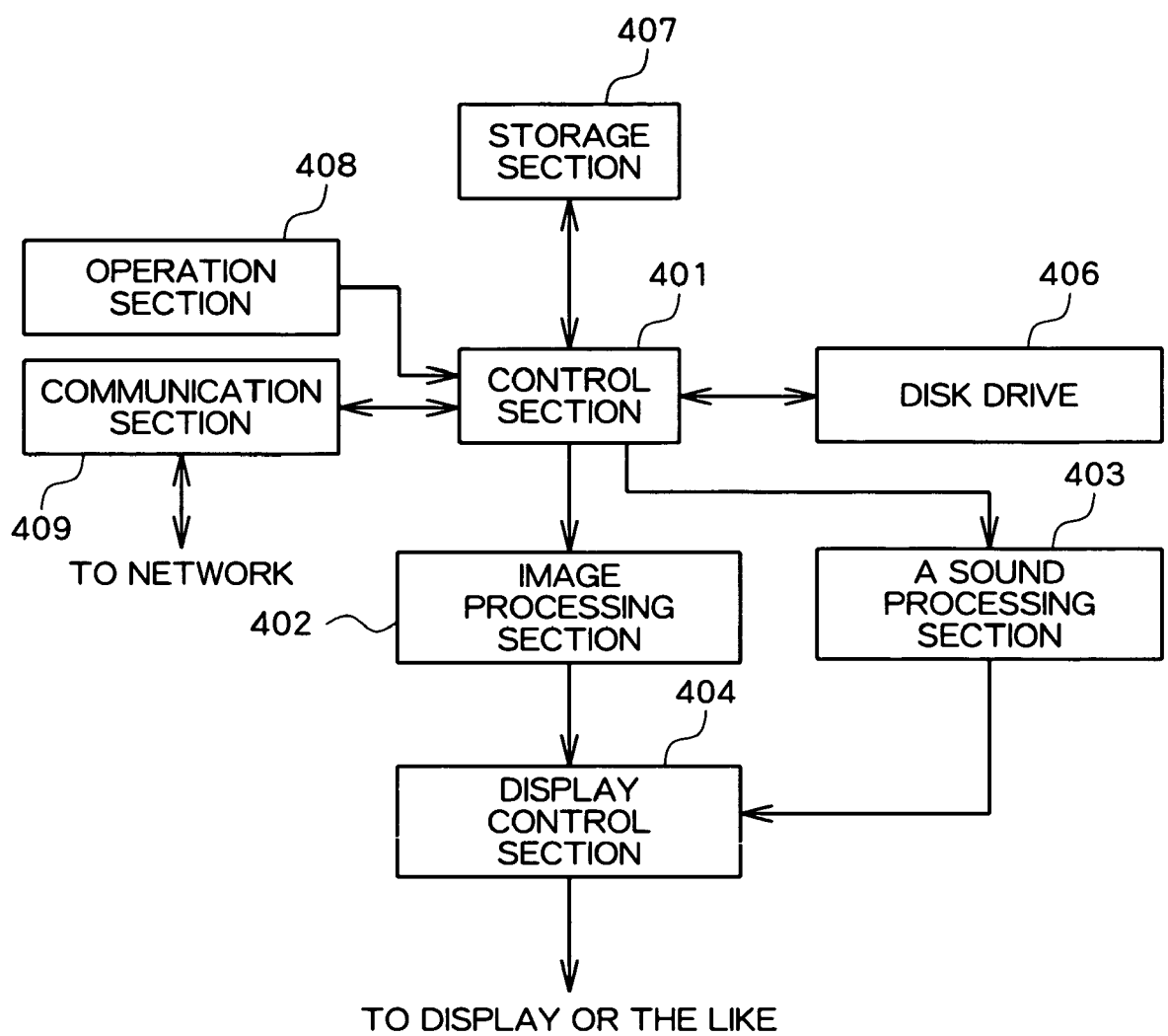
FIG. 14 is a structural block diagram showing an example of a reproduction device in a third embodiment of the present invention.

A reproduction device (a music player) in the third embodiment of the present invention is constructed, as shown in FIG. 14, comprising a control section 401, an image processing section 402, a sound processing section 403, a display control section 404, a disk drive 406, a storage section 407, an operation section 408, and a communication section 409.

The control section 401, which can be realized by a CPU, for example, executes a program stored in the storage section 407 or a program read by the disk drive 406. In the third embodiment, the control section 401 executes a program (a DJ program) for combining and reproducing music piece data. The content of the process to be carried out by the control section 401 in connection with the program will be described later in detail.

The image processing section 402 is a graphic processor for executing a rendering process according to an instruction input from the control section 401. The result of the rendering process carried out by the image processing section 402 is output to the display control section 404. The sound processing section 403 produces and outputs a sound signal according to an instruction input from the control section 401.

The display control section 404 converts the result of the rendering process carried out by the image processing section 402 into a video signal, and outputs to the outside. The video signal may be, for example, an RGB signal or an NTSC signal. The display control section 404 also outputs the sound signal output from the sound processing section 403 to the outside. In the above, in the case where the video signal is a television signal in an NTSC format or the like, the sound signal may be arranged so as to be contained in the television signal. The video signal is presented by a display device or a home-use television set, for example, while the sound signal is output as sound via the sound circuit of an external stereo device or a home-use television set.

The disk drive 406 comprises, for example, a portable optical disc drive for a DVD, CD, or the like, and a hard disk drive. The storage section 407 is constructed comprising a memory element such as an RAM (Random Access Memory), ROM (Read Only Memory), or the like. This storage section 407 may hold a program to be executed by the control section 401. The storage section 407 also functions as a work memory for holding data which is necessary in the process carried out by the control section 401.

Figure 15:
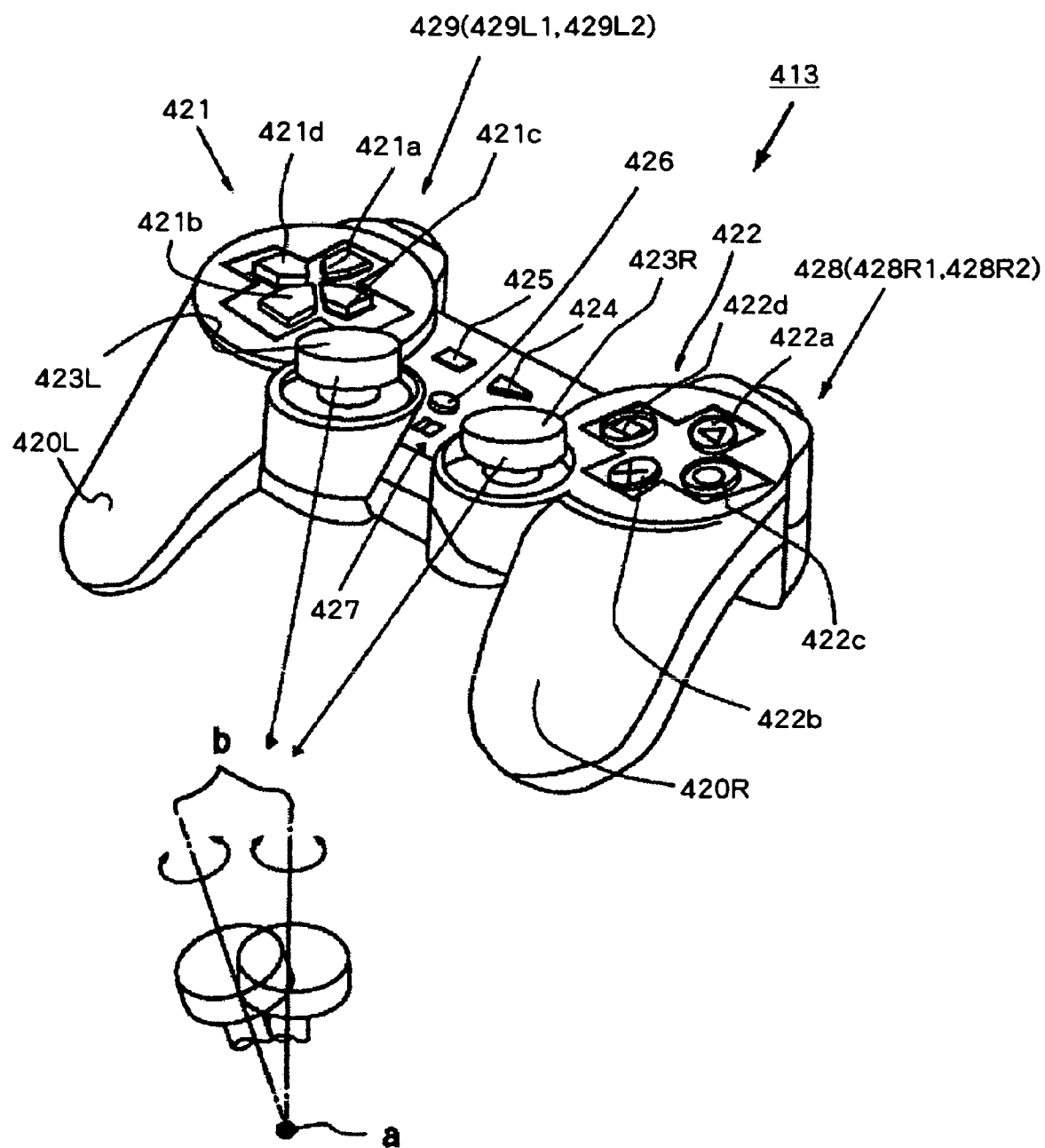
FIG. 15 is a perspective view showing an example of a controller.

The operation section 408 may be a keyboard, a mouse, or the controller of a consumer game machine. Specifically, a controller of a consumer game machine will be described here as an example. A controller which serves as an operation section 408 comprises grip sections 420R, 420L, as shown in FIG. 15. The user is expected to grasp these grip sections 420 using his/her right and left hands, respectively. At positions capable of being operated by the user with their thumbs while grasping the grip sections 420, first and second operation sections 421, 422 and analogue operation sections 423R, 423L are provided.

Here, in the first operation section 421, an upper direction instruction key 421*a*, a lower direction instruction key 421*b*, a right direction instruction key 421*c*, and a left direction instruction key 421*d* are provided. While using these instruction keys 421*a*, 421*b*, 421*c*, and 421*d*, the user specifies, for example, an operation object on the screen.

Also, in the second operation section 422, a triangle button 422a having a triangular imprint formed thereon, an X button 422b having an X-shaped imprint formed thereon, an O button 422c having an O-shaped imprint formed thereon, and a rectangle button 422d having a rectangular imprint formed thereon are provided. These buttons 422a, 422b, 422c, and 422d are assigned with respective operation contents according to an operation object specified by, for example, the direction keys 421a, 421b, 421c, and 421d. With this arrangement, the user can operate the operation object specified using the instruction keys 421a, 421b, 421c, and 421d by selecting and pressing an appropriate button 422a, 422b, 422c, and 422d.

The analogue operation sections 423R, 423L are adapted to an operation by being tilted with the point a serving as a fulcrum. The analogue operation sections 423R, 423L are also adapted to rotation in the tilted posture around the rotational axis b which is defined as passing through the point a. During an operation in a non-tilting position, these operation sections 423R, 423L are held in a standing position, as shown in FIG. 15, and maintained in the untitled position (a reference position).

When these operation sections 423R, 423L are subjected tilting operation by being pressed, coordinate values (x, y) on the x-y coordinate which are defined according to the amount and direction of the tilt relative to the reference position are determined and output as an operation output of to the control section 401.

Also, the controller additionally comprises a start button 424 for instructing the control section 401 to initiate execution of a program, and a selection button 425 and a mode selection switch 426 for instructing switching between various modes.

For example, when a specific mode (an analogue mode) is selected by the mode selection switch 426, the light emission diode (LED) 427 is controlled so as to emit light, and the analogue operation sections 423R, 423L are rendered to be in an operating state. Meanwhile, when another mode (a digital mode) is selected, the light emission diode 427 is controlled so as to turn off the light, and the analogue operation sections 423R, 423L are rendered to be in a non-operating state.

Further, on this controller, at positions capable of being operated by the user with their index fingers, for example, while grasping the grip sections 420R, 420L with their right and left hands respectively, a right button 428 and a left button 429 are provided. The respective buttons 428, 429 have first and second right buttons 428R1, 428R2, and first and second left buttons 429L1, 429L2, arranged side by side in the width direction of the controller 13.

The communication section 409 is a network card, a modem, or the like and connected to a network. According to an instruction input from the control section 401, the communication section 409 sends data via the network, receives the data arriving via the network, and outputs the received data to the control section 401. It should be noted that the communication section 409 is not mandatory.

Here, initially, a structure in the reproduction device in the third embodiment, which facilitates adjustment of the reproduction speeds and reproduction start positions of a plurality of music piece to thereby simplify the reproduction in a synchronized manner will be described.

Figure 16:
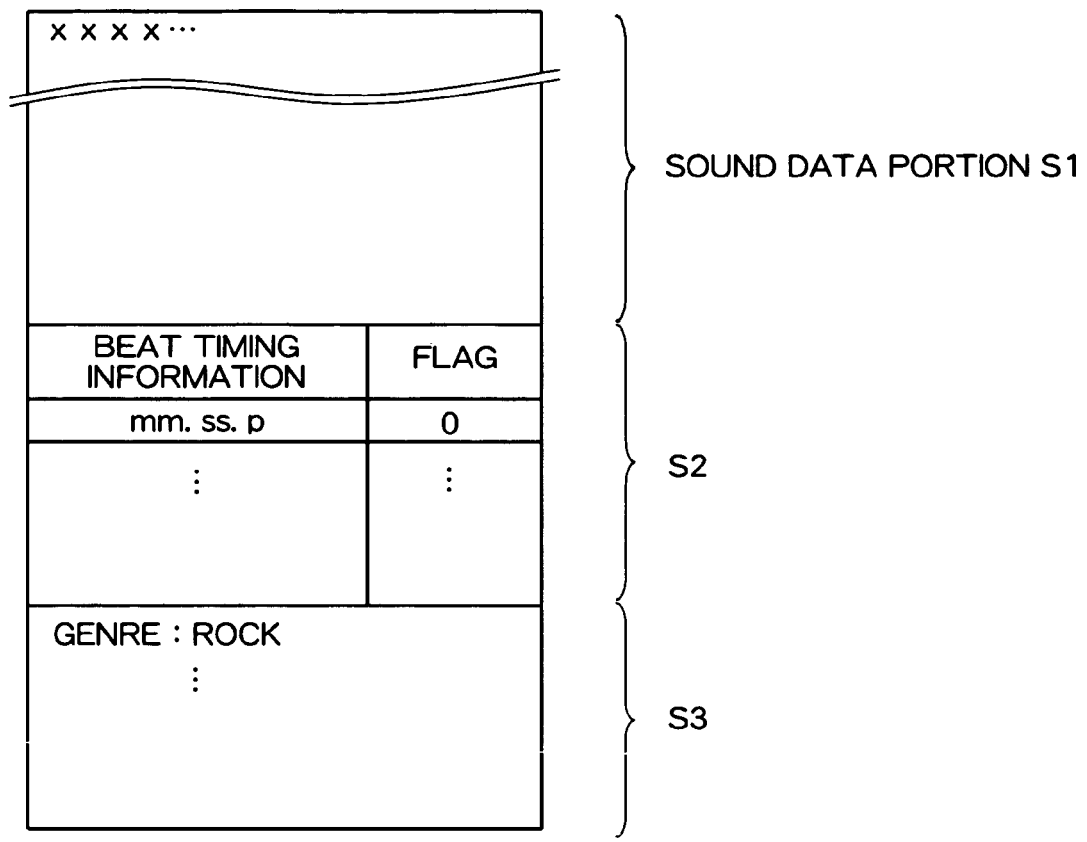
FIG. 16 is a diagram explaining one example of music piece data.
Figure 16:
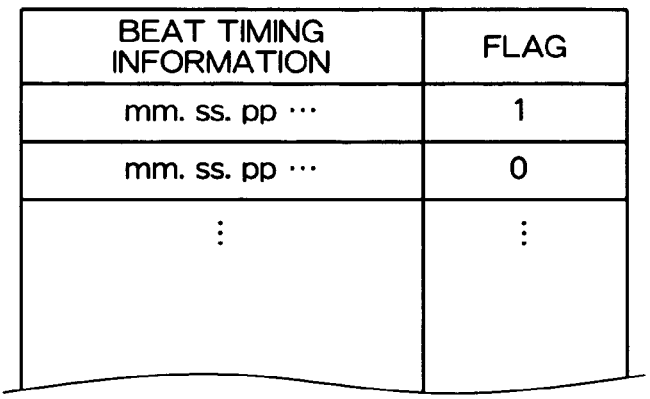

In the third embodiment, the music piece data comprises, as shown in FIG. 16(a), a sound data portion S1, a beat guide data portion S2, and a relevant information portion S3. Here, the sound data portion S1 is data containing a value, for example, which is obtained by digitizing a sound volume value of a sound signal of a music piece for every predetermined cycle (that is, sound data subjected to PCM (Pulse Code Modulation) encoding). The data contained in the sound data portion S1 is converted into a sound signal by means of normal PCM decoding in the sound processing section 403. One of the characteristic features of the third embodiment is the beat guide data portion S2. From the information contained in the beat guide data portion S2, beat timing information indicative of a beat position, default reproduction speed information indicative of a speed to reproduce in default, and measure information indicative of the head position of each measure of the music piece are obtained.

Specifically, the beat guide data portion S2 contains beat timing information and a flag which is associated with the beat timing information, as shown in FIG. 16(b). The beat timing information denotes a beat position in the form of a reproduction period of time elapsed after the head position (as for PCM sound data, the default reproduction speed is determined based on a sound volume value acquisition cycle when encoding the PCM sound data) when decoding the PCM signal contained in the sound data portion S1. A flag associated with the beat timing information corresponding to the head position of each measure is set as one, while a flag associated with other beat timing information is set as zero.

Although the beat guide data portion S2 may be contained in advance in each of the music piece data (prepared in advance by the distributor of the music piece data), alternatively, in the case where the user obtains the data on a music piece from an audio CD or the like, to use, the user may designate the beat and the head position of a measure by operating the controller while reproducing the music piece. As a further alternative, the control section 401 may produce the beat guide data portion S2 based on the variation of the sound volume of the music piece data. As a still further alternative, a server for holding information for specifying a music piece and information on the beat guide data portion S2 in the manner of being associated with each other may be provided on the network, so that the beat guide data portion S2 is acquired via the communication section 409.

In the third embodiment, use of the beat guide data portion S2 facilitates the adjustment of the reproduction speeds and reproduction start positions of a plurality of music pieces to thereby simplify the reproduction in a synchronized manner. That is, during the reproduction carried out by the control section 401 based on a plurality of music piece data, the head positions of the measures contained in the beat guide data portion S2 of the respective music piece data are made coincident with one another. Then, where a default reproduction speed (BPM) is calculated based on the beat timing information and the sound volume value acquisition cycle at the time of PCM encoding, at least a part of the reproduction speed is changed from the default value, whereby the reproduction speeds of the music pieces are made coincident with each other. It should be noted that the value of the reproduction speed (a BPM value) may alternatively be calculated when an instruction requesting reproduction is made or calculated in advance and stored in the music piece data.

Figure 17:
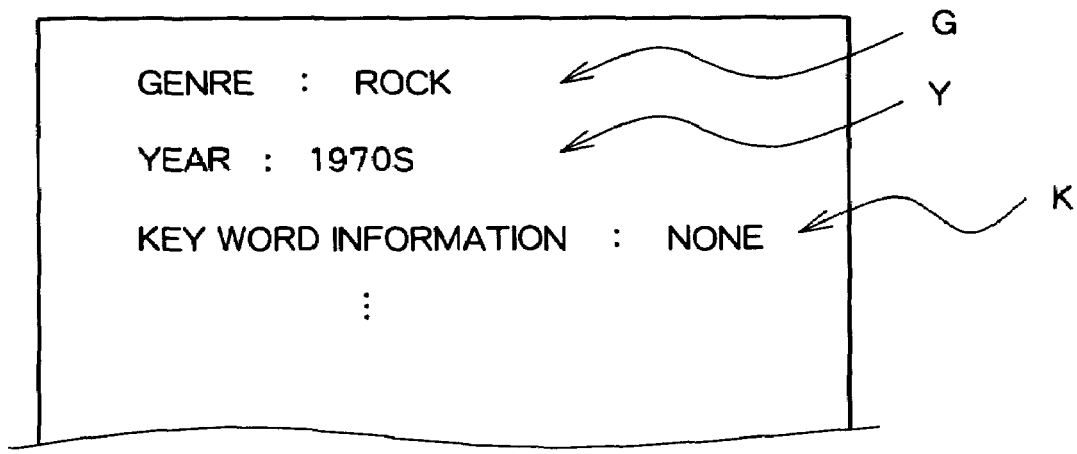
FIG. 17 is a diagram explaining an example of a content of a relevant information portion.

The relevant information portion S3 contains genre information G, as shown in FIG. 17. Here, a case in which year information Y and key word information K are additionally contained beside the genre information G will be described as an example. The respective information contained in the relevant information portion S3 may be contained in advance in the music piece data, or, alternatively, can be obtained from a server, such as a CDDB (CD Database), or the like, provided on the network in an arrangement in which music piece data is imported from a CD or the like. As an alternatively, the user may input such information by himself/herself. The value of the reproduction speed may be contained in the relevant information portion S3.

Specifically, the genre information G is information of the same kind as the classification employed in a CD shop or the like, including "classic", "easy listening", "electronic", "dance", "jazz", "J pop", "pop", "rock", "reggae", "popular song", "idol", or the like. The year information is information denoting a year when that music piece was released or became popular. The key word information is any character array information, such as "sea", "summer" or the like.

Figure 18:
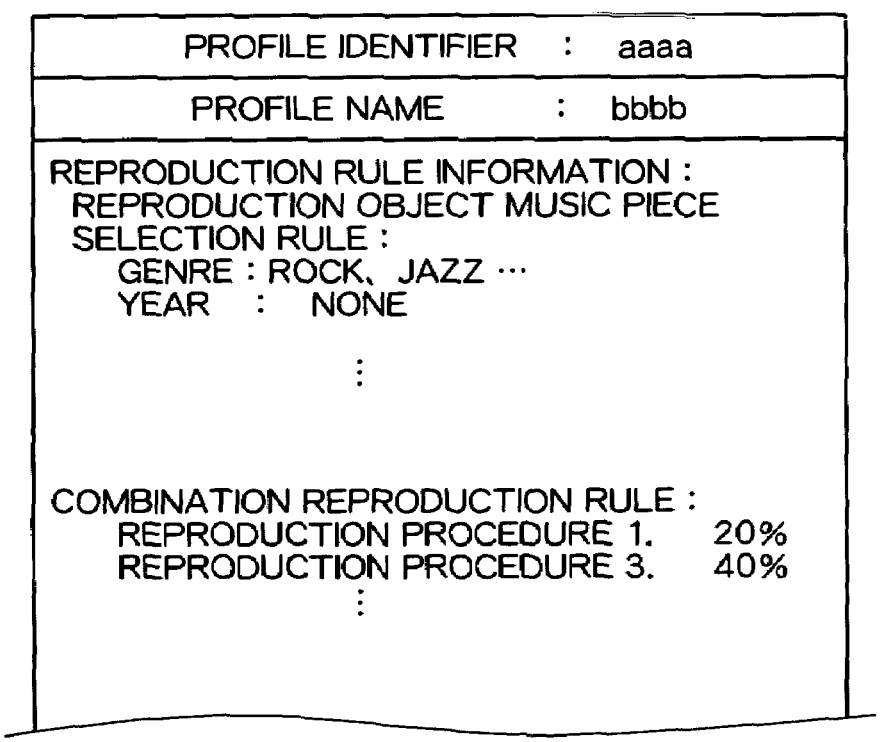
FIG. 18 is a diagram explaining an example of profile information.

Thereafter, in the third embodiment, a plurality of profile information pieces, each corresponding to a combination reproduction algorithm, are stored in a hard disk, an optical disc, or the like, and read by the disk drive 406. As shown in FIG. 18, the profile information contains a profile identifier, a profile name, information on a reproduction rule (reproduction rule information), and presentation condition information. The reproduction rule information contains a rule regarding selection of a music piece (a reproduction object music piece selection rule) parameter information).

Here, the reproduction object music piece selection rule may be, for example, a combination of information on a genre, year, reproduction speed, and so forth. A reproduction object music piece selection rule may be defined as, for example, "the reproduction speed is equal to or slower than 105 BPM, the genre is 'soul', 'rock', 'pop', and 'jazz', and the year is not designated", or the like. The combination reproduction rule is a list of some of a plurality of predetermined combination reproduction procedures. The combination reproduction procedure will be described later in detail.

In the following, the content of the processing to be carried out by the control section 401 will be described.

Figure 19:
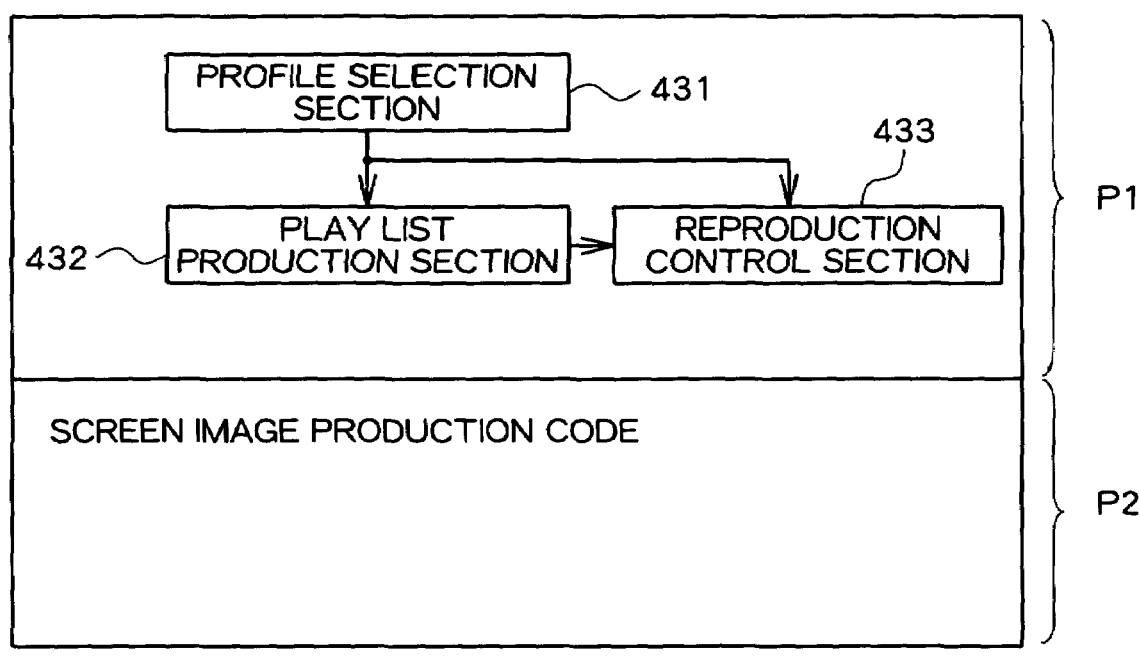
FIG. 19 is a functional block diagram showing an example of a program to be executed by the reproduction device in the third embodiment of the present invention.

As shown in FIG. 19, a combination reproduction program (a DJ program) to be executed by the control section 401 in the third embodiment contains a reproduction process code P1 for carrying out a process to reproduce a sound signal based on music piece data and a screen image production code P2 for controlling the image processing section 402 so as to produce a user interface screen image. The reproduction process code P1 comprises a profile selection section 431, a play list production section 432, and a reproduction control section 433.

The profile selection section 431 selects at least one of the profile information pieces for presentation from among a plurality of profile information pieces, and presents the selected profile information piece. Then, reproduction rule information relevant to the profile selected by the user is read from the profile information presented, and output to the play list production section 432 and the reproduction control section 433.

Figure 20:
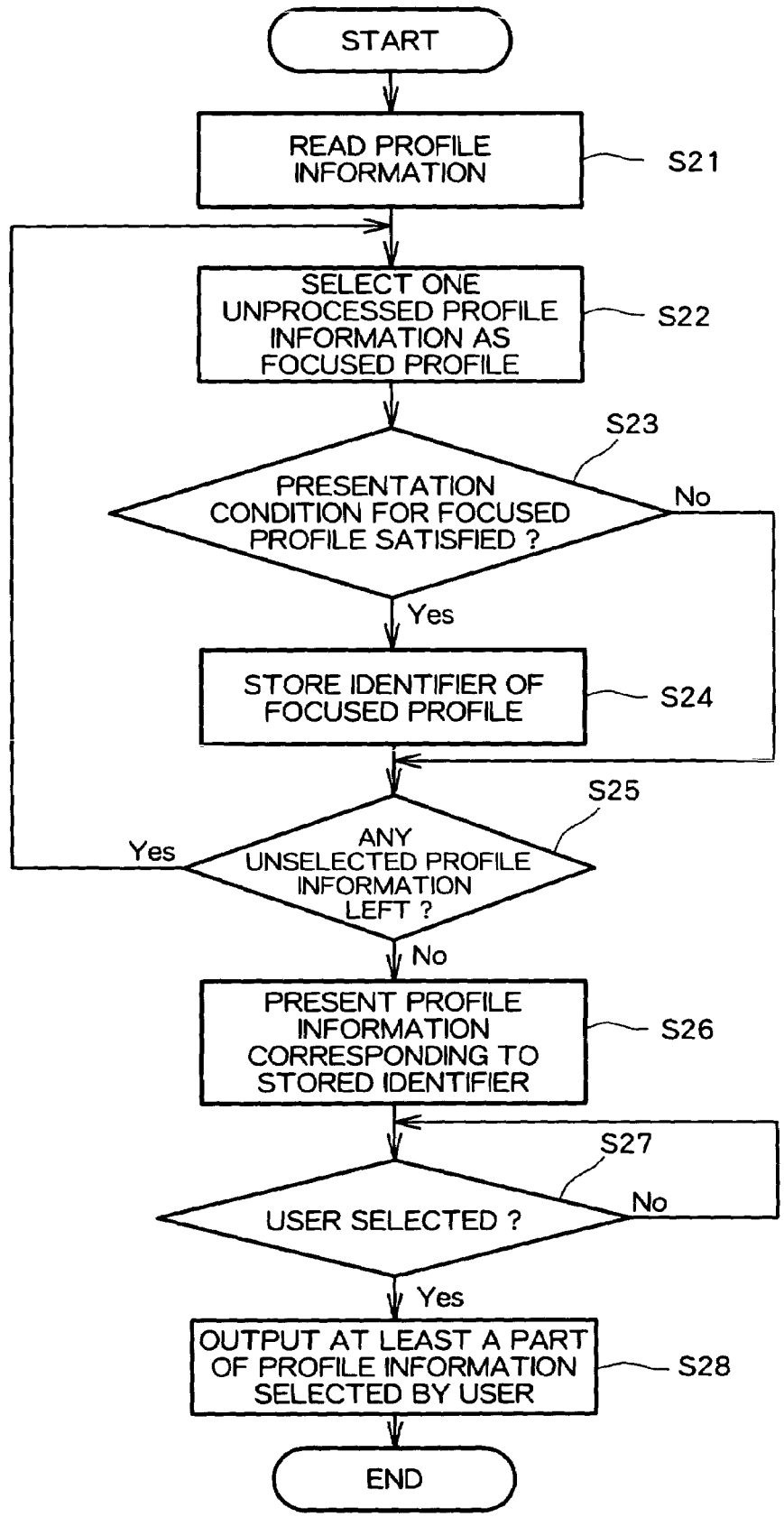
FIG. 20 is a flowchart of an example of a process to present profile information.

Specifically, the profile selection section 431 carries out the process shown in FIG. 20. That is, the control section 401 initially reads a plurality of profile information pieces from the hard disk or the optical disc (S21), and then selects one of the read profile information pieces (one yet to be selected as profile information) as focused profile information (S22). Thereafter, while referring to the presentation condition information contained in the focused profile information, whether or not the condition described in the presentation condition information is satisfied is determined (S23).

It should be noted that the presentation condition information is a condition concerning the relevant information of music piece data, a condition concerning time and date, and so forth. The presentation condition information may be a condition based on a condition which can be obtained via a network, such as a condition concerning weather, an astronomical event, or the like. Specifically, the presentation condition information is a condition concerning the number of music piece data which are selected according to the music piece selection rule (reproduction object music piece selection rule). The presentation condition information may be a condition defined such that, for example, data on twenty or more pieces of music, each having a reproduction speed equal to or slower than 105 BPM and falling in the genres "soul", "rock", "pop", or "jazz", is recorded in a hard disk or an optical disc.

When it is determined in step S23 that the presentation condition information of the focused profile information is satisfied (Yes), the control section 401 stores the profile identifier of the focused profile information as an object for presentation in the storage section 407 (S24). Then, whether or not there is any profile information yet to be selected as focused profile information is determined (S25). When it is determined that there is some unselected profile information left (Yes), the process returns to step S22 to repeat the process to select one of the unselected profile information pieces. Alternatively, when it is determined in step S23 that the presentation condition information of the focused profile information is not satisfied (No), the control section 401 shifts to the process S25 to continue the process.

When it is determined in step S25 that no unselected profile information is left, the control section 401 acquires the respective profile identifiers stored in the storage section 407 as objects for presentation, acquires the profile names from the profile information corresponding to the acquired profile identifiers, and instructs the image processing section 402 to display the acquired profile names in the form of a menu (S26). With this arrangement, a menu showing a list of the names of the profiles which are objects for presentation is shown in the display or the like.

Thereafter, the control section 401 waits until the user selects one of the profile names listed in the menu (S27). When one profile name is selected, reproduction rule information contained in the profile information corresponding to the selected profile name is read (S28) before the process by the profile selection section 431 ends. The reproduction rule information which is read in step S28 is used in a process to be carried out by the play list production section 432 and the reproduction control section 433.

In the third embodiment, only the profile information containing presentation condition satisfied is available for selection. Therefore, specifically, it is possible to arrange such that profile information appears for the first time only when twenty or more pieces of jazz are imported and accumulated. With this arrangement, an impersonated element as if a DJ who performs only a jazz mix did not appear when no sound source for jazz is available, that is, human spontaneity, can be produced, resultantly enhancing the entertainment value.

In the case where the presentation condition information is time and date information, the control section 401 determines whether or not the present time and date (time and date when the process is being carried out) satisfies the presentation condition information while referring to a calendar and/or a clock (not shown) Specifically, with respect to the presentation condition information defined as "from 21:00 to 4:00", it is determined that the condition is satisfied when the time and date when the process in step S3 is carried out is the same as the time defined in the presentation condition information. Alternatively, with respect to the presentation condition defined as "from December $1^{st}$ to $25^{th}$", it is determined that the condition is satisfied when the date when the process in step S3 is carried out is within the period defined by the presentation condition.

Likewise, with respect to the presentation condition information defined as "fine" as weather information, it is determined that the presentation condition information is satisfied when the weather in a specific region (the region is predetermined in advance), which is known via a network, is fine. Further, in the case where the time of sunrise and/or sunset can be known via the network, it may be determined that the presentation condition information is satisfied when the time when the process in step S3 is carried out is within a predetermined period of time preceding or following that time. Alternatively, determination can be made based on various conditions such as the age of the moon, a date with a meteor swarm maximized, a predetermined anniversary (birthday or the like), and so forth.

In the following, a process to be carried out by the play list production section 432 will be described. The play list production section 432 produces a list (a play list) showing the music pieces for reproduction. The play list shows information pieces each specifying music piece data which are listed in order of reproduction of the relevant music pieces.

Specifically, while using as a key the genre information and/or year information which are defined by the reproduction object music piece selection rule contained in the reproduction rule information input from the profile selection section 431, the play list production section 432 selects music piece data from among those recorded in a hard disk or an optical disc, which contains relevant information in conformity with the key as a candidate for reproduction.

Thereafter, the play list production section 432 randomly selects music piece data from the reproduction candidates, which is to be listed at the top of the play list, and then checks the reproduction speed of that music piece data listed at the top of the play list (the preceding piece speed). As for the music piece data having a reproduction speed varying in the middle thereof, the reproduction speed at a representative position such as the head portion of the music piece, or the like, may be calculated as a reproduction speed.

Subsequently, the play list production section 432 randomly selects a candidate for music piece data to be next included in the play list, and calculates the reproduction speed of that music piece (a subsequent piece speed). When the difference between the preceding and subsequent piece speeds is larger than a predetermined value (this value can also be included in the reproduction object music piece selection rule), the process to randomly select a music piece data candidate to be next included in the play list is repeated.

Meanwhile, when the difference between the preceding and subsequent piece speeds is smaller than the predetermined value, the selected music piece data candidate is added to the play list, and the process to randomly select a music piece data candidate to be next included in the play list is repeated using the reproduction speed of the added music piece as the preceding piece speed.

Alternatively, the play list production section 432 may narrow down the music piece candidates to be included subsequent to the preceding music piece in the play list, while referring to the reproduction rule information. For example, with respect to the reproduction rule information which defines that music pieces in a specific genre should not be combined in succession (for example, in the case where it is defined such that "jazz" is not reproduced immediately after "rock", with a specific example of the case to be described later), music piece data which does not satisfy the condition may be excluded from the candidates based on the genre of the preceding music piece before the random selection.

Also, the reproduction object music piece selection rule may define the limit number of times in which the same music piece repeatedly appears in the play list. For example, when the limit value is set as "1", a music piece which is included in the play list once is prohibited from being included in the same play list. The play list production section 432 initializes the appearance frequency counter for counting the number of times in which each of the music piece data included in the reproduction candidates appears in the play list, and stores in the storage section 407. The appearance frequency counter for certain music piece data is incremented when that music piece data is added to the play list. Thereafter, when music piece data is selected as a subsequent music piece candidate, the appearance frequency counter for the selected music piece data candidate is referred to, and when the value of the counter is in excess of the above-described limit value, the process to randomly select a music piece data candidate to be next included in the play list is repeated.

With the process as described above, the play list production section 432 produces a play list, and outputs the produced play list to the reproduction control section 433. The reproduction control section 433 combines and reproduces the music piece data in the order defined in the play list input from the play list production section 432 while referring to the reproduction rule information output from the profile selection section 431.

Here, the combination reproduction rule (reproduction parameter information) contained in the reproduction rule information will be described. As described above, the reproduction rule contains at least one combination reproduction procedure.

The combination reproduction procedure is formed from a combination of eight kinds of DJ commands described below. That is, a reproduction procedure in the third embodiment is formed from a combination of the following eight kinds of DJ commands.

(1) HEAD

HEADS indicates a start of four-measure-fade-in. That is, HEAD is a DJ command for introducing a music piece while changing the sound volume from the lowest to a designated sound volume within four measures.

(2) LONG HEAD

LONGHEAD indicates a start of sixteen-measure-fade-in.

(3) TAIL

TAIL indicates a start of four-measure-fade-out.

(4) LONG TAIL

LONGTAIL indicates a start of sixteen-measure-fade-out.

(5) CUTIN

CUTIN indicates a start to switch music pieces with no fade effect used.

(6) SABI

SABI indicates a start of the main subject portion of a music piece with effect applied before and after the start.

(7) BREAK

BREAK is used together with DUB described below, and means superimposition of a DUB portion set in another music piece for sixteen measures from the position indicated by BREAK.

(8) DUB

DUB is used together with BREAK described above, and means superimposition over a BREAK portion set in another music piece for sixteen measures from the position indicated by DUB.

It should be noted that a DJ command is not limited to the above described commands, and may include, for example, a command to be attached to first and second predetermined positions of music piece data to designate repetitive reproduction of the portion between the first and second positions, a command for changing the reproduction speed, a command for controlling the cut-off frequency of a low pass filter, or the like.

In the following, before description of a specific content of a combination reproduction procedure, in order to facilitate understanding, a specific method for a reproduction process will be described.

In the third embodiment, the control section 401 carries out the following process in order to combine and reproduce a plurality of music piece data. That is, the control section 401 prepares a plurality of virtual turn tables (a table for controlling music piece data). For simplification of the description, it is assumed here that two turn tables (hereinafter referred to as a turn table A and a turn table B) are prepared. Specifically, the control section 401 contains, as a data structure representative of a virtual turn table, information for specifying the music piece data virtually placed on the turn table (music piece specifying information) and a main flag telling whether the relevant turn table is a main or sub-turn table.

The control section 401 sets the music piece specifying information for to the music piece data of the music piece listed first in the play list (a first music piece) in the data structure representative of the turntable A, and sets the main flag for determining the turntable A as a main turntable. The control section 401 additionally sets the music piece specifying information relevant to the music piece data of a music piece listed second in the play list in the data structure representative of the turn table B, and sets the main flag for determining the turntable B as a sub-turntable.

Then, the control section 401 begins reproduction of the music piece data relevant to the turntable A which is set as a main turntable. In the above, the reproduction speed of the music piece data of the second music piece, for example, is adjusted according to the reproduction speed of the music piece data of the first music piece. It should be noted that, depending on the difference between the reproduction speeds of the preceding and subsequent music pieces, the control section 401 may gradually change the reproduction speed of the preceding music piece so as to become identical to that of the subsequent music piece at the end of the reproduction of the preceding music piece (a position with TAIL or CUTIN set therein).

It should be noted that the condition concerning the difference between the reproduction speeds which is to be referred to in determining whether or not to gradually change the reproduction speed may be determined such that, for example, the difference is equal to or smaller than 2%, and can be set in advance in the reproduction rule information.

Thereafter, in the case where a DJ command CUTIN is set, for example, the reproduction of the music piece data on the turn table A is stopped at the point with CUTIN added, and the reproduction of the music piece data of the turntable B begins. In the above, the control section 401 exchanges the main flags of the data structures of the turntables A, B so that the turntable A is determined as a sub-turntable and the turntable B is determined as a main turntable.

Further, the control section 401 sets the music piece specifying information on the music piece data of the music piece listed third in the play list, in the data structure of the turn table A.

It should be noted here that the main flags may be exchanged by the control section 401 when a process relevant to HEAD or LONGHEAD and CUTIN selected from among the above-described DJ commands is carried out, for example. Alternatively, a command for exchanging the main and sub-turntables may be prepared beside it DJ command, and set along with the DJ command.

In the following, an example of a combination reproduction procedure will be described.

It should be noted that a combination reproduction procedure is a description of a procedure, for example, for setting any of the above-described DJ commands at a timing indicated by the beat timing information in the music piece data (a main music piece) which is set in the main turntable. In the third embodiment, music piece data can be combined and reproduced without a sense of unease as a result of the arrangement in which the above-described DJ command is set at a timing (for example, a start position of a measure) indicated by the beat timing information.

Beside this procedure, information describing a procedure for setting any of the above-described DJ commands at a timing indicated by the beat timing information, in the music piece data (a sub-music piece) which is set in the sub-turn table may be included.

One example of a combination reproduction procedure will be an instruction such as "TAIL is set in a random start position of a measure in the main music piece, and HEAD is set in a random start position of a measure in the sub-music piece". Here, the start position of a measure is a time indicated by the beat timing information having a flag "1".

The above-described combination reproduction procedures define a plurality of combination reproduction methods, including one in which the preceding and subsequent music pieces are connected in a cross-fade manner, another in which reproduction of the subsequent music piece begins in a cut-in manner immediately after an effect is applied (for example, application of a low-pass filter) to the preceding music piece, and so forth.

In the third embodiment, a plurality of rules (designation data) on a combination reproduction procedure are prepared in advance and stored in a hard disk, an optical disc, or the storage section 407, and the profile information defines the combination reproduction procedure to use, which is described in the manner of being associated with the information on a usage rate (see FIG. 18). For example, the reproduction rule information of certain profile information may define that a combination reproduction procedure for cross-fade is used by 20% (the reproduction procedure 1 in FIG. 18), that for cut-in is used by 40% (the reproduction procedure 3 in FIG. 18), that for combination of BREAK and DUB is used by 10% (BREAK is set in the main music piece, while DUB is set in the sub-music piece), and so forth.

In the process carried out by the reproduction control section 433, the control section 401 randomly selects the combination reproduction procedure at a number of times in accordance with the rate which is defined in the reproduction rule information of the selected profile information, and applies to the music piece data being reproduced.

The reproduction rule information may include information which defines the range of the reproduction periods of time of the respective music piece data. For example, the reproduction rule information of certain profile information may define that the respective music piece data are switched every 30 minutes to one minute. According to this setting, the control section 401 randomly determines a timing at which to add a DJ command (that is, a position indicated by a beat timing, for example, a start position of a measure, for example) within a period of time between thirty seconds and one minute after the reproduction start time of each music piece data.

It should be noted that the number of DJ commands added in one music piece data is not limited to one and that a plurality of DJ commands may be added (for example, the preceding and subsequent music pieces are combined and reproduced using BREAK and DUB, and the reproduction of the subsequent music piece thereafter begins using CUTIN, or the like).

It should be noted that, in the third embodiment, in combination reproduction defined by a pair of an end position designation command comment, such as TAIL, LONGTAIL, or the like, and a start position designation command comment, such as HEAD, LONGHEAD, or the like, it is determined that the pair indicative of a function which requires a shorter period of time to complete is applied with priority.

Specifically, when the end position designation command comment is either TAIL or LONG TAIL and the start position designation command comment is CUTIN, basically, the reproduction of the preceding music piece is stopped at a beat timing to which TAIL or LONG TAIL is attached, and the reproduction of the subsequent music piece begins in a cut-in manner from the beat timing to which CUTIN is attached.

As for the combination of TAIL or LONG TAIL and HEAD or LONG HEAD, four-measure-cross-fade is applied except for the combination of LONG TAIL and LONG HEAD. As for the combination only of LONG TAIL and LONG HEAD, long mix, that is, sixteen-measure-cross-fade, is applied.

Further, in the third embodiment, various sound data, including a male vocoder voice (vocal sound subjected to predetermined acoustic effect) and a female vocoder voice, wave sound, telephone bell, rain sound, uproar in a town, sound made by a glass in a bar, animal voice such as a dolphin, explosion, scratching, synthesizer sound, and so forth, may be stored in advance as sound effects (SE) in a hard disk, an optical disc, or the like, and may be superimposed over the reproduced sound of music piece data by the reproduction control section 43.

Specifically, in the third embodiment, information for specifying an SE to use is contained in the profile information, and the reproduction control section 433 randomly determines whether or not to superimpose an SE. When it is determined to superimpose an SE, a position at which to superimpose that SE is randomly determined. Then, after an SE for use in superimposition is randomly selected from among those specified by the profile information selected, the sound data of the randomly selected SE is superimposed, and reproduced, over the reproduced data of the music piece in the randomly determined superimposition position. It should be noted that an SE superimposition position is not necessarily coincident with a beat timing.

Alternatively, for example, information for specifying a DJ command suitable for a superimposition position may be made associated with each SE, and after an SE for use in superimposition is randomly determined, whether or not the DJ command specified by the information relevant to the determined SE is associated with the main or sub music piece is determined. When it is determined that the DJ command is associated with either the main or sub main piece, the SE may be reproduced in a superimposed manner in the position indicated by the DJ command.

In an example in which information specifying a DJ command CUTIN is associated with the SE of a scratching sound and the control section 401 determines that a scratching sound is to be superimposed, a scratch sound can be reproduced in a superimposed manner by adjusting the timing such that the end of the scratching sound data coincides with the position for CUTIN in the main music piece. With this arrangement, the subsequent music piece can be reproduced as if the subsequent music were introduced after being scratched. That is, an SE can be effectively utilized.

In the following, a screen image production code P2 to be carried out by the control section 401 will be described.

As already described, the control section 401 realizes combination reproduction of music piece data using the reproduction process code P1, in which a user interface screen or a visual effect which may vary in accordance with the reproduction of the music piece data is shown on the screen of a display or a home-use television set through the operation of the control section 401.

In the above, the user's instruction is received in order to determine which of a user interface screen image or a visual effect screen image is to be displayed on the screen.

Figure 21:
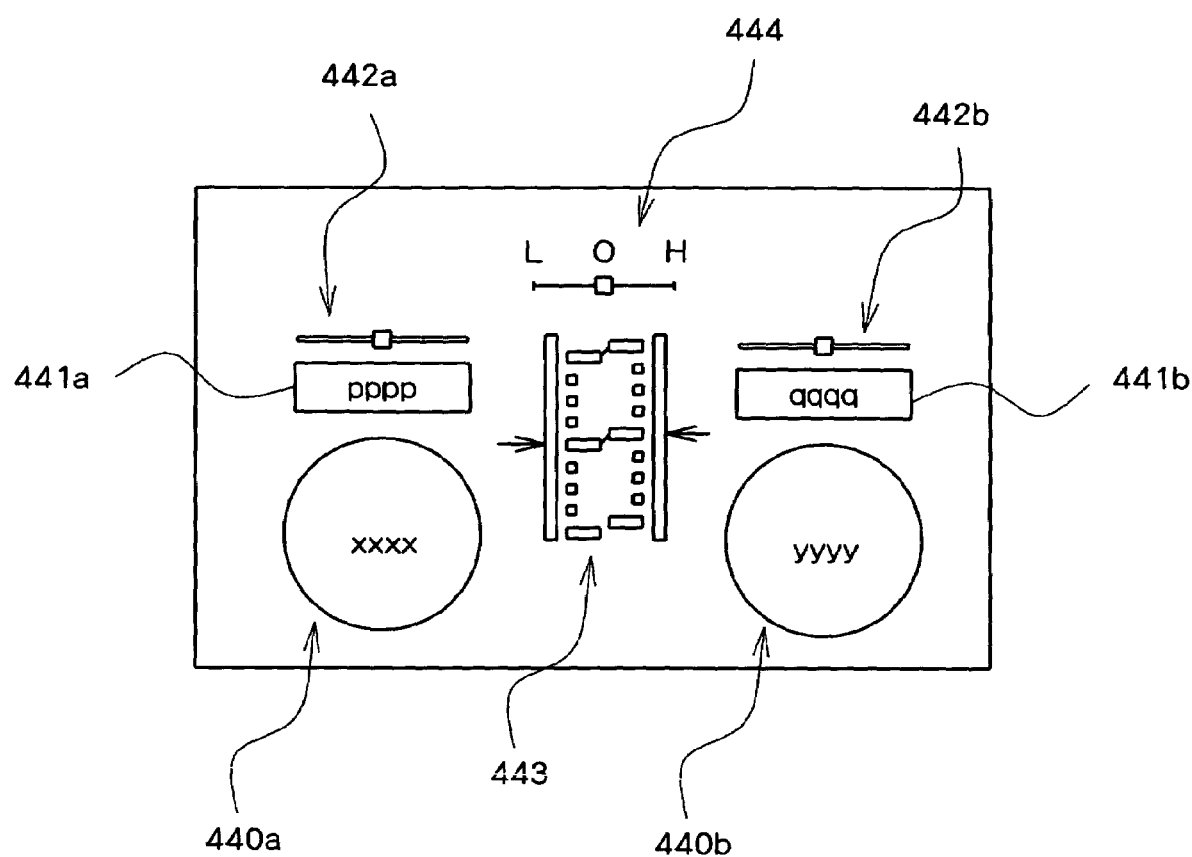
FIG. 21 is a diagram explaining an example of a screen image of a user interface.

When a user interface screen i-age is instructed to be displayed, the control section 401 displays turntable objects 440a, 440b for indicating virtual turntables, as shown in FIG. 21, on the screen. On the user interface screen, there are additionally shown, corresponding to the respective turntable objects, music piece display sections 441a, 441b for indicating the music piece data among those included in the play list, which are currently set in the respective turntables, volume objects 442a, 442b for indicating the sound volumes of the respective music piece data, a beat guide display section 443 for indicating a beat timing and/or a measure start position of each music piece data and for moving, while scrolling together with the reproduction of the music piece, to indicate the current reproduction position, and a cut-off slider object 444 for indicating the cut-off frequency of a cut filter (a low pass filter) as an effect. Further, numeric value information for indicating the reproduction positions of the music piece data are shown on the respective turntables with an animation of a rotating turntable being shown during the reproduction.

The user may operate, for example, the first right button 428 R1 and the first left button 429 L1 while the screen image is shown, to thereby instruct termination of the ongoing reproduction of the music piece data being displayed and initiation of the reproduction of the next music piece data. In this case, however, employment of an arrangement in which the ongoing reproduction of the music piece is simply stopped and the reproduction of the next music piece begins may deteriorate the atmosphere in which combination reproduction by a virtual DJ (that is, DJ mix) is enjoyed.

In order to address the above, initially, the control section 401 determines whether or not the turntable relevant to the ongoing reproduction is a main turntable, and when it is determined that the table is the main turntable, sets the next music piece data on the sub-turntable. Thereafter, a music piece end designation (any randomly determined one from CUTIN, TAIL, and LONGTAIL) is added to the start position of a measure closest and subsequent to the current reproduction position of the music piece being reproduced, and a music piece start designation (any randomly determined one from CUTIN, HEAD, and LONGHEAD) is added to the head position or the start position of a randomly determined measure of the music piece data relevant to the sub-turntable. This arrangement can prevent deterioration of the atmosphere in which combination reproduction is carried out as the reproduction of the music piece data shifts according to a DJ command.

Meanwhile, when it is determined that the current reproduction is carried out with the sub-turntable, start of the reproduction of a music piece relevant to the main turntable is waited for. This is because in the case where a music piece relevant to the sub-turntable, not the main turntable, is being reproduced, it is possible that it is just in the midst of the execution of a process designated by the DJ commands including BREAK on the main side and DUB on the sub side. Then, after reproduction of the music piece relevant to the main turntable begins, the next music piece data (the music piece immediately after the music piece currently set in the sub-turntable) is set in the sub-turntable.

As described above, the reproduction device in the third embodiment can set profile information so as not to appear in the initial state but appear later as selectable when many "rock" music pieces are imported and accumulated and so forth.

In another example, it is possible to set profile information before Christmas, so as to appear when many Christmas songs (for example, music piece data having relevant information containing a key word "Christmas") are imported and accumulated.

As described above, it is possible to control profile information so as to appear depending on the genre of the music piece imported, a time and date when the process is carried out, weather and temperature of the day when the process is carried out, and any other conditions. It is also possible to set, for each of the profile information pieces, the manner of reproduction of a music piece or a video (that is, the type of a music piece or video to be reproduced, peculiarity in the manner of combination, that is, the type and frequency of use of a DJ command in use, and so forth).

This arrangement makes it possible not only to select a DJ by calling on those included in the DJ list, but also to produce human spontaneity, such as an encounter with a new DJ, which can resultantly enhance the entertainment value.

Further, as the control device 401 in the third embodiment can be connected to a camera, it may be possible to cut out at least a part of the image data captured using the camera and display on the interface screen. For example, when music piece data is imported from a CD, for example, album title information indicative of the CD from which the music piece data is imported may be associated with the music piece data. Then, the control section 401, having received the image of the CD jacket which is captured using a camera, stores the received image data in a hard disk or the like in a manner of being associated with the album title information. The album title information relevant to the currently reproduced music piece data may be acquired when the interface screen is displayed, and the image data associated with the acquired album title information may be displayed on the screen.

It should be noted that the present invention is not limited to the embodiments mentioned above as examples.

The invention claimed is:

1. A music piece reproduction device for connecting a plurality of music pieces, comprising:
a recording section for at least temporarily recording a plurality of music piece data each possessing a sound data file indicative of a music piece for reproduction and a beat guide file containing information on the sound data file;
a control section for controlling so as to connect the sound data files of the plurality of music piece data recorded in the recording section, using a predetermined method; and
a sound processing section for outputting a sound while connecting the plurality of sound data files according to control by the control section,
wherein
a command comment indicating what kind of editing is capable of being performed in which position in the music piece is added to each of the beat guide files of the plurality of music piece data, and
when connection between the sound data file of a preceding music piece which is a music piece to be reproduced in a preceding order and the sound data file of a subsequent music piece which is a music piece to be reproduced subsequent to the preceding music piece is controlled, the control section carries out successive reproduction of the preceding music piece and the subsequent music piece depending on the command comment of the preceding music piece and the command comment of the subsequent music piece.

2. The music piece reproduction device according to claim 1,
wherein
the command comment contains a start position designation command comment to be added to a desired reproduction start position of the music piece and an end position designation command comment to be added to a desired reproduction ending position of the music piece, and
the control section controls, while referring to the end position designation command comment added to the beat guide file possessed by the preceding music piece and the start position designation command comment added to the beat guide file possessed by the subsequent music piece, such that the desired reproduction ending position of the preceding music piece coincides with the desired reproduction start position of the subsequent music piece.

3. The music piece reproduction device according to claim 1, further comprising a communication section for carrying out an information communication process utilizing an electrical communication line.

4. The music piece reproduction device according to claim 3,
wherein
the control section compares a plurality of music pieces included in a play list which shows an order to reproduce the plurality of music pieces and the plurality of music piece data recorded in the recording section, and when it is determined that there is music piece data which is lacking in achieving reproduction of the music pieces included in the play list, the control section controls the communication section so as to download the music piece data which is lacking via the electrical communication line, and at least temporarily records the music piece data downloaded in the recording section.

5. The music piece reproduction device according to claim 1, wherein
upon receipt of an instruction, during reproduction of music piece data, which requests start of reproduction of music piece data to be reproduced immediately subsequent to the music piece data being reproduced, the control section controls such that the music piece data being reproduced and the music piece data to be reproduced immediately subsequent to the music piece data being reproduced are successively reproduced in a cross-fade manner.

6. A music piece reproduction device for connecting a plurality of music piece, comprising:
a recording section for at least temporarily recording a plurality of music piece data each having a sound data file indicative of a music piece for reproduction and a beat guide file containing information on the sound data file;
a control section for controlling so as to connect the sound data files of the plurality of music piece data recorded in the recording section, using a predetermined method; and
a sound processing section for outputting a sound while connecting the plurality of sound data files according to control by the control section, wherein the beat guide files of the plurality of music piece data each contains a reproduction speed indicative of a speed at which to reproduce the sound data file, when connection between the sound data file of a preceding music piece which is a music piece to be reproduced in a preceding order and the sound data file of a subsequent music piece which is a music piece to be reproduced subsequent to the preceding music piece is controlled, the control section carries out successive reproduction of the preceding music piece and the subsequent music piece while adjusting at least one of a reproduction speed of the preceding music piece and a reproduction speed of the subsequent music piece based on a relationship between the reproduction speed of the preceding music piece and the reproduction speed of the subsequent music piece, and when the reproduction speed of the preceding music piece is faster than the reproduction speed of the subsequent music piece, and a reproduction speed of a further subsequent music piece, which is to be reproduced after the subsequent music piece, is faster than the reproduction speed of the subsequent music piece, or when the reproduction speed of the preceding music piece is slower than the reproduction speed of the subsequent music piece, and the reproduction speed of the further subsequent music piece which is to be reproduced after the subsequent music piece, is slower than the reproduction speed of the subsequent music piece, the control section controls the sound processing section so as to reproduce the subsequent music piece at a speed faster or slower than the reproduction speed that is contained in the beat guide file for the subsequent music piece.

7. The music piece reproduction device according to claim 6, wherein the control section carries out successive reproduction of the preceding music piece and the subsequent music piece while referring to the beat guide files of the preceding music piece and the subsequent music piece, by arranging such that the reproduction speeds of the preceding music piece and the subsequent music piece are synchronized with each other when the desired reproduction ending position of the preceding music piece coincides with the desired reproduction start position of the subsequent music piece by gradually changing at least one of the reproduction speeds of the preceding music piece and the subsequent music piece so as to be closer to another reproduction speed when a difference between the reproduction speeds of the preceding music piece and the subsequent music piece is equal to or smaller than a predetermined value.

8. The music piece reproduction device according to claim 6, wherein where there are three or more music pieces to be reproduced, the control section determines an order to reproduce the plurality of music piece data while considering the reproduction speeds indicated by the beat guide files of the respective music pieces, such that the music pieces having relatively close reproduction speeds are reproduced in succession.

9. A music piece reproduction method for reproducing, while connecting, a plurality of music piece data each possessing a sound data file indicative of a music piece for reproduction and a beat guide file containing information on the sound data file, using a predetermined method, comprising:

adding a command comment indicating what kind of editing is capable of being performed at which position in the music piece to each of the beat guide files of the plurality of music pieces; and successively reproducing, when the sound data file of a preceding music piece which is a music piece to be reproduced in a preceding order and the sound data file of a subsequent music piece which is a music piece to be reproduced subsequent to the preceding music piece are connected to each other, the sound data files of the preceding music piece and the subsequent music piece, depending on the command comment of the preceding music piece and the command comment of the subsequent music piece.

10. The music piece reproduction method according to claim 9, wherein upon receipt of an instruction, during reproduction of music piece data, which requests start of reproduction of music piece data to be reproduced immediately subsequent to the music piece data being reproduced, the music piece data being reproduced and the music piece data to be reproduced immediately subsequent to the music piece data being reproduced are successively reproduced in a cross-fade manner.

11. A music piece reproduction method for connecting a plurality of the music piece data using a predetermined manner, wherein each music piece data possesses a sound data file indicative of a music piece for reproduction and a beat guide file containing information on the sound data file, comprising:

reading a reproduction speed indicative of a speed at which to reproduce the sound data file contained in each of the beat guide files of the plurality of music pieces; and successively reproducing, when the sound data file of a preceding music piece which is a music piece to be reproduced in a preceding order and the sound data file of a subsequent music piece which is a music piece to be reproduced subsequent to the preceding music piece are connected to each other, the preceding music piece and the subsequent music piece while adjusting at least one of a reproduction speed of the preceding music piece and a reproduction speed of the subsequent music piece based on a relationship between the reproduction speed of the preceding music piece and the reproduction speed of the subsequent music piece, wherein when the reproduction speed of the preceding music piece is faster than the reproduction speed of the subsequent music piece, and a reproduction speed of a further subsequent music piece, which is to be reproduced after the subsequent music piece, is faster than the reproduction speed of the subsequent music piece, or when the reproduction speed of the preceding music piece is slower than the reproduction speed of the subsequent music piece, and the reproduction speed of the further subsequent music piece which is to be reproduced after the subsequent music piece, is slower than the reproduction speed of the subsequent music piece, reproducing the subsequent music piece at a speed faster or slower than the reproduction speed that is contained in the beat guide file for the subsequent music piece.

12. A computer readable storage medium storing a program for causing a computer to execute a process including:

a data recording process of at least temporarily recording a plurality of music piece data in a recording section, each music piece data possessing a sound data file indicative of a music piece for reproduction and a beat guide file containing information on the sound data file;
a data connection process of connecting the sound data files of the plurality of music piece data recorded in the recording section, using a predetermined method;
a sound output process of outputting sounds of the sound data files connected to each other; and
a process of enabling addition of a command comment indicating what kind of editing is capable of being performed at which position in the music piece, to each of the beat guide files of the plurality of music piece data, wherein
the data connection process is a process of successively reproducing, when the sound data file of a preceding music piece which is a music piece to be reproduced in a preceding order and the sound data file of a subsequent music piece which is a music piece to be reproduced subsequent to the preceding music piece are connected to each other, the preceding music piece and the subsequent music piece depending on the command comment of the preceding music piece and the command comment of the subsequent music piece.

13. The computer readable storage medium according to claim 12, wherein
the command comment contains a start position designation command comment to be added to a desired reproduction start position of the music piece and an end position designation command comment to be added to a desired reproduction ending position of the music piece, and
the data connection process is a process of causing the desired reproduction ending position of the preceding music piece to coincide with the desired reproduction start position of the subsequent music piece, while referring to the end position designation command comment added to the beat guide file possessed by the preceding music piece and the start position designation command comment added to the beat guide file possessed by the subsequent music piece.

14. The computer readable storage medium according to claim 12, wherein
the program causes the computer to carry out a process, when there are three or more music pieces to be reproduced, to determine an order to reproduce the plurality of music piece data while considering the reproduction speeds indicated by the beat guide files of the respective music pieces, such that the music pieces having relatively close reproduction speeds are reproduced in succession.

15. The computer readable storage medium according to claim 12, wherein
the process further includes a process of successively reproducing, upon receipt of an instruction, during reproduction of music piece data, which requests start of reproduction of music piece data to be reproduced immediately subsequent to the music piece data being reproduced, the music piece data being reproduced and the music piece data to be reproduced immediately subsequent to the music piece data being reproduced, in a cross-fade manner.

16. A computer readable storage medium storing a program for causing a computer to carry out a process including:
a data recording process of at least temporarily recording a plurality of music piece data in a recording section, each music piece data possessing a sound data file indicative of a music piece for reproduction and a beat guide file containing information on the sound data file;
a data connection process of connecting the sound data files of the plurality of music piece data recorded in the recording section, using a predetermined method;
a sound output process of outputting sounds of the sound data files connected to each other,
the process further including:
a process of reading a speed, with respect to the beat file of each of the plurality of music piece data, at which to reproduce the sound data file, wherein
the data connection process is a process of successively reproducing, when the sound data file of a preceding music piece which is a music piece to be reproduced in a preceding order and the sound data file of a subsequent music piece which is a music piece to be reproduced subsequent to the preceding music piece are connected to each other, the preceding music piece and the subsequent music piece, while adjusting at least one of a reproduction speed of the preceding music piece and a reproduction speed of the subsequent music piece based on a relationship between the reproduction speed of the preceding music piece and the reproduction speed of the subsequent music piece, and
when the reproduction speed of the preceding music piece is faster than the reproduction speed of the subsequent music piece, and a reproduction speed of a further subsequent music piece, which is to be reproduced after the subsequent music piece, is faster than the reproduction speed of the subsequent music piece,
or
when the reproduction speed of the preceding music piece is slower than the reproduction speed of the subsequent music piece, and the reproduction speed of the further subsequent music piece which is to be reproduced after the subsequent music piece, is slower than the reproduction speed of the subsequent music piece,
reproducing the subsequent music piece at a speed faster or slower than the reproduction speed that is contained in the beat guide file for the subsequent music piece.

17. The computer readable storage medium according to claim 16, wherein
the data connection process includes
a process of determining whether or not a difference between the reproduction speeds of the preceding music piece and the subsequent music piece is equal to or smaller than a predetermined value while referring to the beat guide files of the preceding music piece and the subsequent music piece, and
a process of gradually changing at least one of the reproduction speeds of the preceding music piece and the subsequent music piece so as to be close to another reproduction speed when the difference of the reproduction speeds is equal to or smaller than the predetermined value, so that the reproduction speeds of the preceding music piece and the subsequent music piece are synchronized with each other when the desired reproduction ending position of the preceding music piece coincides with the desired reproduction start position of the subsequent music piece.

18. A reproduction device for reproducing a plurality of music pieces or video data, connected so as to be able to access a rule holding section for holding a plurality of reproduction rules, and a condition holding section for holding a presentation condition in a manner of being associated with each of the reproduction rules, comprising:

a rule selection section for presenting to a user, a list of the reproduction rules each of which satisfies the corresponding presentation condition held in the condition holding section, from the reproduction rules held in the rule holding section, and for having the user select one of the presented reproduction rules; and a reproduction section for carrying out combination reproduction of music pieces or videos using the plurality of music pieces or video data based on the reproduction rule selected.

19. The reproduction device according to claim 18, connected so as to be able to access a relevant information holding section for holding, as for each of the plurality of music pieces or video data, relevant information relevant to each of the music pieces or videos, wherein the presentation condition contains a condition relevant to the relevant information, and the rule selection section selects, while referring to the relevant information held by the relevant information holding section, one of the reproduction rules which satisfy the presentation condition.

20. The reproduction device according to claim 19, wherein the relevant information contains information relevant to a genre of a music piece or a video.

21. The reproduction device according to claim 19, wherein the reproduction rule contains a rule relevant to selection of a music piece or a video.

22. The reproduction device according to claim 21, wherein the rule relevant to selection of a music piece or video is a rule for selection of a music piece or a video based on the relevant information.

23. The reproduction device according to claim 22, wherein the presentation condition is a condition concerning a number of music pieces or videos to be selected based on the rule for selection of a music piece or video from among the music pieces or videos held in the relevant information holding section.

24. The reproduction device according to claim 18, wherein the presentation condition contains a condition concerning a time and date, and the rule selection section selects one of the reproduction rules which satisfy the presentation condition, while referring to information on a time or date.

25. A reproduction method for carrying out combination reproduction of music pieces or videos using a plurality of music pieces or video data, and causing a computer, having rule holding means for holding a plurality of reproduction rules concerning combination reproduction, and condition holding means for holding a presentation condition in a manner of being associated with each of the reproduction rules, to present to a user, a list of the reproduction rules each of which satisfies the corresponding presentation condition held in the condition holding means, from the reproduction rules held in the rule holding means, to have the user select one of the reproduction rules presented, and to carry out combination reproduction of music pieces or videos using the plurality of music pieces or video data based on the reproduction rule selected.

26. A computer readable storage medium storing a program for carrying out combination reproduction of music pieces or videos using a plurality of music pieces or video data, the program causing a computer, having rule holding means for holding a plurality of reproduction rules concerning combination and reproduction and condition holding means for holding a presentation condition in a manner of being associated with each of the reproduction rules, to carry out a procedure for presenting to a user, a list of the reproduction rules each of which satisfies the corresponding presentation condition held in the condition holding means, from the reproduction rules held in the rule holding means, and for having the user select one of the presented reproduction rules, and a procedure for carrying out combination reproduction of music pieces or videos using the plurality of music pieces or video data based on the reproduction rule selected.

* * * * *